United States Patent
Matsuda

(10) Patent No.: US 9,415,694 B2
(45) Date of Patent: Aug. 16, 2016

(54) POWER DEVICE OF ELECTRIC VEHICLE

(75) Inventor: Yoshimoto Matsuda, Kobe (JP)

(73) Assignee: Kawasaki Jukogyo Kabushiki Kaisha, Osaka-shi (JP)

(*) Notice: Subject to any disclaimer, the term of this patent is extended or adjusted under 35 U.S.C. 154(b) by 559 days.

(21) Appl. No.: 13/882,731

(22) PCT Filed: Nov. 5, 2010

(86) PCT No.: PCT/JP2010/006521
§ 371 (c)(1),
(2), (4) Date: May 17, 2013

(87) PCT Pub. No.: WO2012/059962
PCT Pub. Date: May 10, 2012

(65) Prior Publication Data
US 2013/0234505 A1     Sep. 12, 2013

(51) Int. Cl.
*B60L 1/00*     (2006.01)
*B60L 11/18*    (2006.01)
(Continued)

(52) U.S. Cl.
CPC .............. *B60L 11/1803* (2013.01); *B60K 1/02* (2013.01); *B60L 3/0061* (2013.01); *B60L 7/14* (2013.01);
(Continued)

(58) Field of Classification Search
CPC .............. B60K 1/02; B60K 2001/0405; B60L 2240/486; B60L 11/1803; B60L 3/0061; B60L 7/14; B60L 15/007; B60L 2220/14; B60Y 2200/12; B62K 11/04; B62K 2204/00; B62M 7/04
USPC .......................................................... 307/9.1
See application file for complete search history.

(56) References Cited

U.S. PATENT DOCUMENTS

| | | | |
|---|---|---|---|
| 2005/0082992 A1* | 4/2005 | Aizawa | B60K 6/44 318/66 |
| 2010/0082191 A1* | 4/2010 | Seo | B60K 6/46 701/22 |
| 2012/0058858 A1* | 3/2012 | Ichikawa | B60K 6/442 477/5 |

FOREIGN PATENT DOCUMENTS

| | | | | |
|---|---|---|---|---|
| DE | 3832950 | * | 5/1989 | ............ F16D 13/64 |
| JP | 64087924 A | | 4/1989 | |

(Continued)

OTHER PUBLICATIONS

ISA Japan, International Search Report of PCT/JP2010/006521, Feb. 15, 2011, WIPO, 3 pages.

*Primary Examiner* — Jared Fureman
*Assistant Examiner* — Duc M Pham
(74) *Attorney, Agent, or Firm* — Alleman Hall McCoy Russell & Tuttle LLP

(57) ABSTRACT

A power device of an electric vehicle according to the present invention includes an electricity storage device which stores electricity of direct current, an inverter device which generates alternating current from the direct current stored in the electricity storage device, multiple electric motors which receive supply of electricity of the alternating current generated by the inverter device and generate a traveling driving force, and a driving force transmission mechanism which transmits rotation of each output shaft portion of the multiple electric motors to a driving wheel. The driving force transmission mechanism is configured such that rotation of each output shaft portion is transmitted to the driving wheel with an equal speed change ratio, and the multiple electric motors are connected to a single inverter device, and configured to receive electricity supply of the alternating current generated by the single inverter device.

11 Claims, 12 Drawing Sheets

(51) Int. Cl.

| | | |
|---|---|---|
| *B60K 1/02* | (2006.01) | |
| *B62K 11/04* | (2006.01) | |
| *B62M 7/04* | (2006.01) | |
| *B60L 3/00* | (2006.01) | |
| *B60L 7/14* | (2006.01) | |
| *B60L 15/00* | (2006.01) | |
| *B60L 15/20* | (2006.01) | |
| *B60K 1/04* | (2006.01) | |

(52) U.S. Cl.
CPC ........... *B60L 11/1877* (2013.01); *B60L 15/007* (2013.01); *B60L 15/2009* (2013.01); *B60L 15/2054* (2013.01); *B62K 11/04* (2013.01); *B62M 7/04* (2013.01); *B60K 2001/0405* (2013.01); *B60L 2200/12* (2013.01); *B60L 2220/14* (2013.01); *B60L 2220/42* (2013.01); *B60L 2240/12* (2013.01); *B60L 2240/36* (2013.01); *B60L 2240/421* (2013.01); *B60L 2240/423* (2013.01); *B60L 2240/425* (2013.01); *B60L 2240/486* (2013.01); *B60Y 2200/12* (2013.01); *B62K 2204/00* (2013.01); *Y02T 10/645* (2013.01); *Y02T 10/648* (2013.01); *Y02T 10/7005* (2013.01); *Y02T 10/705* (2013.01); *Y02T 10/72* (2013.01); *Y02T 10/7275* (2013.01)

(56) References Cited

FOREIGN PATENT DOCUMENTS

| | | | | |
|---|---|---|---|---|
| JP | H07-115706 | * | 10/1993 | ............... B60L 9/18 |
| JP | 07115706 A | | 5/1995 | |
| JP | 2000-083349 | * | 9/1998 | ............... H02K 7/14 |
| JP | 2000083349 A | | 3/2000 | |
| JP | 2005143274 A | | 6/2005 | |
| JP | 2009-291053 | * | 5/2008 | ............. H02K 16/00 |
| JP | 2010-076752 | * | 7/2009 | ............. B60K 7/00 |
| JP | 2009291053 A | | 12/2009 | |
| JP | 2010076752 A | | 4/2010 | |

* cited by examiner

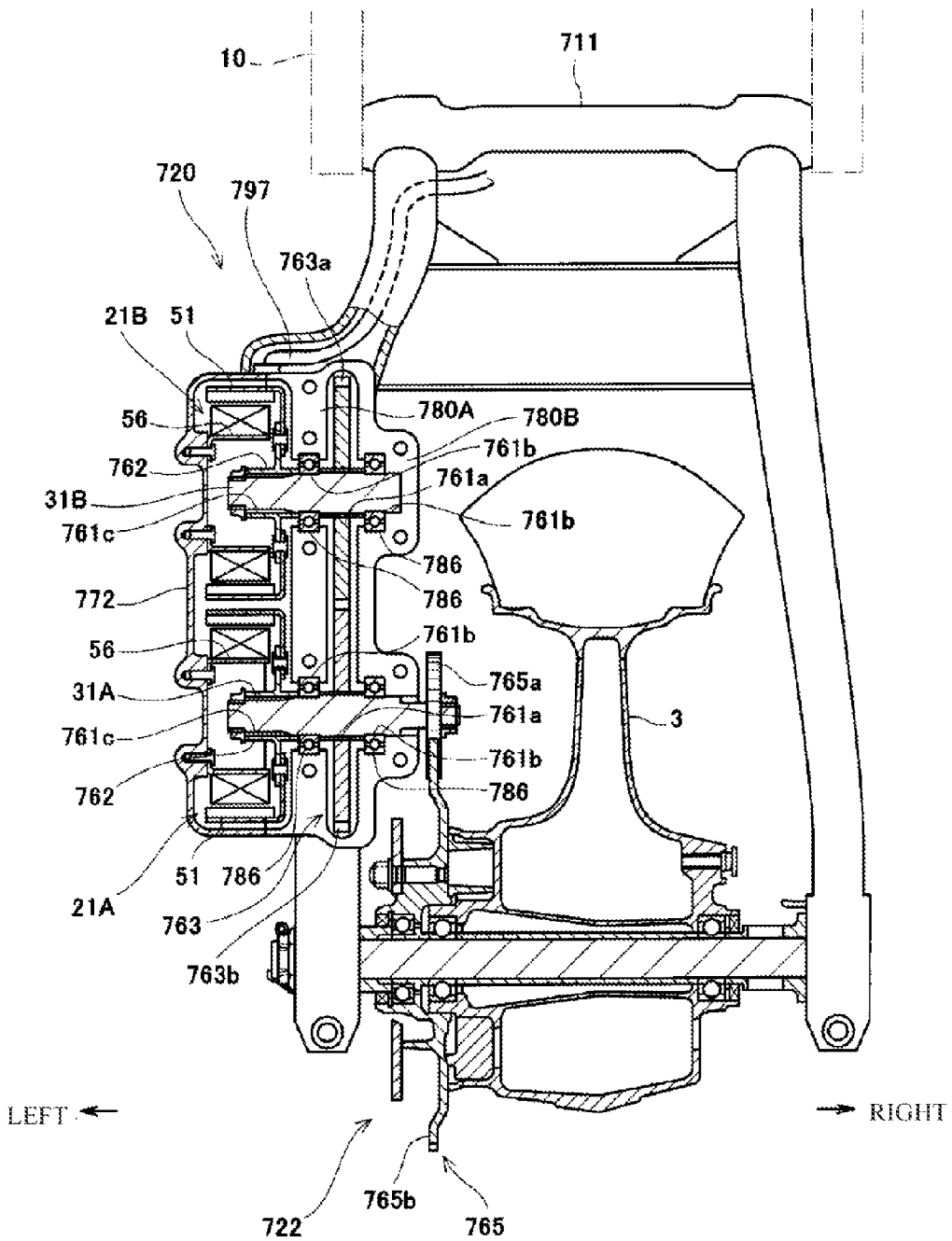

POWER DEVICE OF ELECTRIC VEHICLE

TECHNICAL FIELD

The present invention relates to a power device of an electric vehicle which transmits traveling driving force generated by an electric motor to a driving wheel, and more particularly to a power device of an electric vehicle which is equipped with multiple electric motors.

BACKGROUND ART

Conventionally, there is a known power device of an electric vehicle which is equipped with multiple three-phase alternating current motors and multiple inverters corresponding to the electric motors (for example, refer to Patent Document 1).

PRIOR ART DOCUMENT

Patent Document

Patent Document 1: Japanese Unexamined Patent Publication No. 2005-143274

SUMMARY OF THE INVENTION

Problems to be Solved by the Invention

However, when the inverters are provided for the electric motors in one-on-one correspondence, the number of switching elements which constitute the inverters is also increased. This makes an electrical configuration of the power device complicated and increases the total cost of the power device. Furthermore, the increase in the number of the switching elements which perform high speed switching is likely to lead to a risk that inverter-related failure may occur. This impairs the reliability of the power device.

Therefore, an object of the present invention is to simplify the configuration of a power device of an electric vehicle which is equipped with multiple electric motors.

Solutions to Problems

The present invention has been made to achieve the above objects, and a power device of an electric vehicle according to the present invention includes an electricity storage device that stores direct current as electricity, an inverter device that generates alternating current from the direct current stored in the electricity storage device, multiple electric motors that receive supply of electricity of the alternating current generated by the inverter device and generate a traveling driving force, and a driving force transmission mechanism that transmits rotation of each output shaft portion of the multiple electric motors to a driving wheel, in which the driving force transmission mechanism mechanically connects the output shaft portions to each other so that each of the output shaft portions rotates with an equal speed change ratio with respect to the driving wheel, and the multiple electric motors are connected to the single inverter device so as to receive the supply of electricity of the alternating current generated by the single inverter device.

According to the configuration, since the speed change ratio with respect to the driving wheel of each output shaft portion of the multiple electric motors is mutually equal, when the multiple electric motors are operated under the same electric conditions, synchronization of the multiple electric motors is securable. Accordingly, a single inverter device may be provided for the multiple electric motors, and each electric motor is configured to receive the supply of electricity of the alternating current generated by the inverter device. That is, electricity of the alternating currents of the same phase and same frequency is supplied to each electric motor, and thus the multiple electric motors may operate synchronously. In this way, the configuration of the power device of the electric vehicle can be simplified while securing the synchronization of the multiple electric motors.

Among the multiple electric motors, the output shaft portions of at least two electric motors constitute one common output shaft, and the driving force transmission mechanism is configured to transfer rotation of the common output shaft to the driving wheel.

According to this configuration, with regard to at least two electric motors which constitute one common output shaft, a rotation phase difference which mechanically occurs may be lessened as much as possible, and the synchronization of these electric motors may be secured. Furthermore, since these electric motors are arranged in an axial direction, the whole power device provided with the multiple electric motors can be made compact in a radial direction of the output shaft portion.

A driving force extraction position from which rotation of the common output shaft is extracted is disposed between the two electric motors.

According to this configuration, since distances from the electric motors to the driving force extraction position can be made equal as much as possible, for example, even when a revolution difference occurs between the two electric motors, a torsion of the common output shaft may be satisfactorily prevented.

Rotational inertia of the multiple electric motors may be equally set up.

According to this configuration, a revolution difference between the multiple electric motors may be satisfactorily prevented.

Buffering means may be further provided. The buffering means may be provided in the driving force transmission mechanism in order to buffer a sudden change in the driving force transmitted between the common output shaft and the driving wheel.

According to this configuration, when vehicles jump, the rotation change of elements which constitute the driving force transmission mechanism may be satisfactorily suppressed, and the shock which is applied to the electric motors from the wheels may be satisfactorily alleviated.

The multiple electric motors may be multiphase alternating current motors, each including multiphase coils of an equal number of phases. The single inverter device may be connected to multiphase lines which are configured to output multiphase alternating currents corresponding to the number of phases of the multiphase coils. The coils of the same phase of the multiple electric motors may be connected in parallel to the multiphase lines.

According to this configuration, since the coils are connected in parallel to the multiphase lines, an alternating current voltage of the same value generated by the inverter device can be applied to the coils of each electric motor, and the synchronization of the multiple electric motors may be secured. With this configuration, since potential of the alternating current to be generated by the inverter device can be lowered, it becomes unnecessary to apply an expensive switching element to the inverter device.

The electric motor includes a rotor that rotates about an axial line in response to supply of electricity from the inverter device, and the rotor is spline-fitted into the common output shaft.

According to this configuration, since the rotation phase difference Which mechanically occurs is a minute amount corresponding to a backlash of the spline groove at most, the synchronization of the electric motors may be satisfactorily secured.

Multiple common output shafts extend in parallel with each other, and the driving force transmission mechanism includes an intermediate shaft that extends in parallel with the multiple common output shafts, and a primary driving force transmission mechanism that transmits rotations of the multiple common output shafts to the intermediate shaft with an equal speed change ratio.

According to this configuration, the whole power device equipped with multiple electric motors can be made compact in both the axial direction and the radial direction of the output shaft portion while realizing the configuration in which the speed change ratio of each output shaft portion with respect to the driving wheel is made equal.

Each electric motor may include a rotor that rotates together with the output shaft portion, the rotor including a flange portion that is fixed onto the output shaft portion and extends in the radial direction from an external circumferential surface of the output shaft portion, and a circumferential wall portion that extends from an external edge portion of the flange portion in the axial direction and is disposed to be distanced from an external circumferential surface of the output shaft portion in the radial direction, a permanent magnet that is affixed to an internal circumferential surface of the circumferential wall portion of the rotor, a stator that is formed in a cylindrical shape and is settled in a circular ring-like space formed between the permanent magnet and the external circumferential surface of the output shaft portion, and a coil that is fixed to an external circumferential surface of the stator and face the permanent magnet in the radial direction.

According to this configuration, each electric motor is a so-called outer rotor type SPM (Surface Permanent Magnet) motor. With this configuration, a common alternating current generator which is generally provided in a conventional engine-mounted motorcycle can be diverted as the electric motor of the power device, thereby improving the productivity of the electric motorcycle. Furthermore, since a probability that a permanent magnet separates and falls by centrifugal force is decreased as compared with the inner rotor type SPM motor, the reliability of the power device is increased. Yet furthermore, it is advantageous in that the installing space of the permanent magnet can be secured, and since the rotation radius of the rotor is increased, the torque also increases.

Effects of the Invention

In this way, according to the present invention, it is possible to simplify the configuration of a power device of an electric vehicle which is equipped with multiple electric motors.

BRIEF DESCRIPTION OF THE DRAWING(S)

FIG. 12 is a cross-sectional view illustrating the structure of the periphery of an electric motor of a power device according to an eighth embodiment of the present invention.

BEST MODES FOR CARRYING OUT THE INVENTION

Hereinafter, embodiments of the present invention will be described with reference to the accompanying drawings. In the following description, an electric motorcycle is presented as an embodiment of an electric vehicle according to the present invention, and directions are based on the directions seen from an electric motorcycle's driver. In addition, the same or corresponding components are denoted by the same reference signs throughout all the drawings, and repetitive description will be avoided.

First Embodiment

Figure 1:
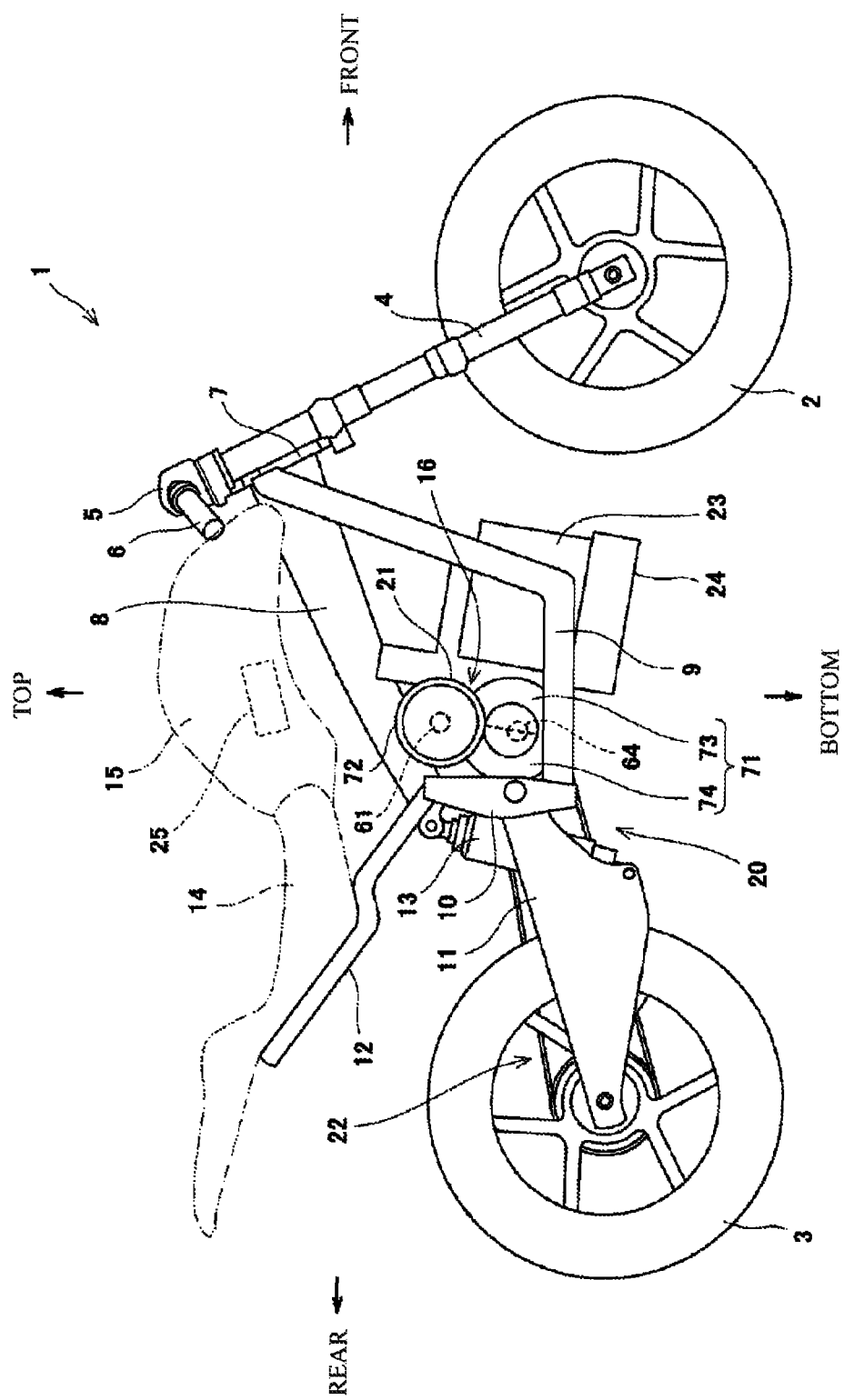
FIG. 1 is a side view of an electric motorcycle, viewed from the right side, which is illustrated as an example of an electric vehicle to which a power device according to a first embodiment of the present invention is applied.

FIG. 1 is a side view of an electric motorcycle 1, viewed from the right side, to which a power device 20 according to a first embodiment of the present invention is applied. As illustrated in FIG. 1, the electric motorcycle 1 includes a front wheel 2 and a rear wheel 3. The front wheel 2 is rotatably supported by a lower end portion of a front fork 4, and the front fork 4 is connected to a handle 5 via a steering shaft (not illustrated). The handle 5 has left and right grips. The right grip of these grips is an accelerator grip 6 to which an acceleration-and-deceleration demand of the driver is input by the driver's operation.

The electric motorcycle 1 includes a body frame. The body frame includes a head tube 7, a main frame 8, a pair of left and right down frames 9, a pivot frame 10, a swing arm 11, and a seat rail 12. The head tube 7 rotatably supports the steering shaft. The main frame 8 extends downward and rearward from the head tube 7, and is arranged in accordance with a central line in a vehicle width direction. Each of the down frames 9 protrudes from the head tube 7 toward the outside in the vehicle width direction, then extends downward, and is finally bent to further extend rearward from there. The pivot frame 10 connects a lower rear end portion of the main frame 8 and each of rear end portions of the down frames 9 to each other. The swing arm 11 is connected such that a front end portion thereof is swingably connected to the pivot frame 10, and a rear end portion thereof rotatably supports the rear wheel 3. A suspension 13 for the rear wheel is stretched and suspended between a front portion of the swing arm 11 and a rear portion of the main frame 8. The seat rail 12 extends rearward with an ups lope from a rear portion of the main frame 8, a driver-riding seat 14 is provided on the seat rail 12, and a dummy tank 15 is provided between the seat 14 and the handle 5 instead of a fuel tank.

The power device 20 includes an electric motor 21, a driving force transmission mechanism 22, an electricity storage device 23, an inverter device 24, and a control device 25. With reference to FIG. 1, an electric motor case member 16 of the electric motor 21 is supported by each rear portion of the main frame 8 and the pair of down frames 9. In addition, the electricity storage device 23, the inverter device 24, and the control device 25 are arranged between the bent portions of the pair of down frames 9, and the control device 25 is accommodated in the dummy tank 15. However, these arrangements may be suitably changed.

Figure 2:
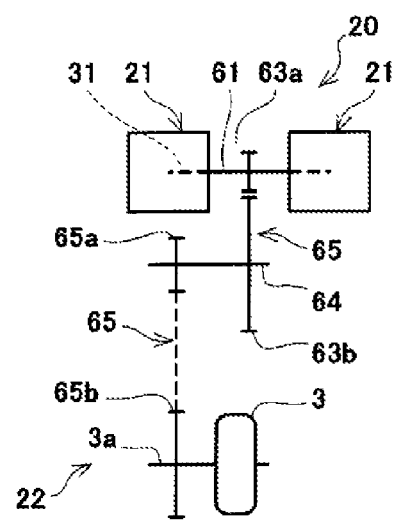
FIG. 2 is a conceptual diagram schematically illustrating a mechanical configuration of the power device illustrated in FIG. 1.

FIG. 2 is a conceptual diagram schematically illustrating a mechanical configuration of the power device 20 illustrated in FIG. 1. As illustrated in FIG. 2, the electric motor 21 is provided plural in number (for example, two). Each electric motor 21 is a three-phase alternating current synchronous motor. Each electric motor 21 generates a traveling driving force when receiving supply of electricity of alternating current, and this rotates an output shaft portion 31 of the electric motor 21. The driving force transmission mechanism 22 transmits rotation of each output shaft portion 31 to the rear wheel 3. As is described below, the driving force transmission mechanism 22 mechanically connects the output shaft portions 31 to each other so that speed change ratios with respect to the rear wheel 3 by the output shaft portions 31 would be equal and rotation phases of the output shaft portions 31 would be in agreement with each other. Therefore, when each electric motor 21 is operated under the same electric conditions (for example, the same phase, the same frequency, the same voltage, and the same current), each electric motor 21 may equally share the traveling load. Hereinafter, the electric configuration of the power device 20 is described. The power device 20 is structured such that the multiple electric motors 21 share the traveling load because of the above-described mechanical configuration.

Figure 3:
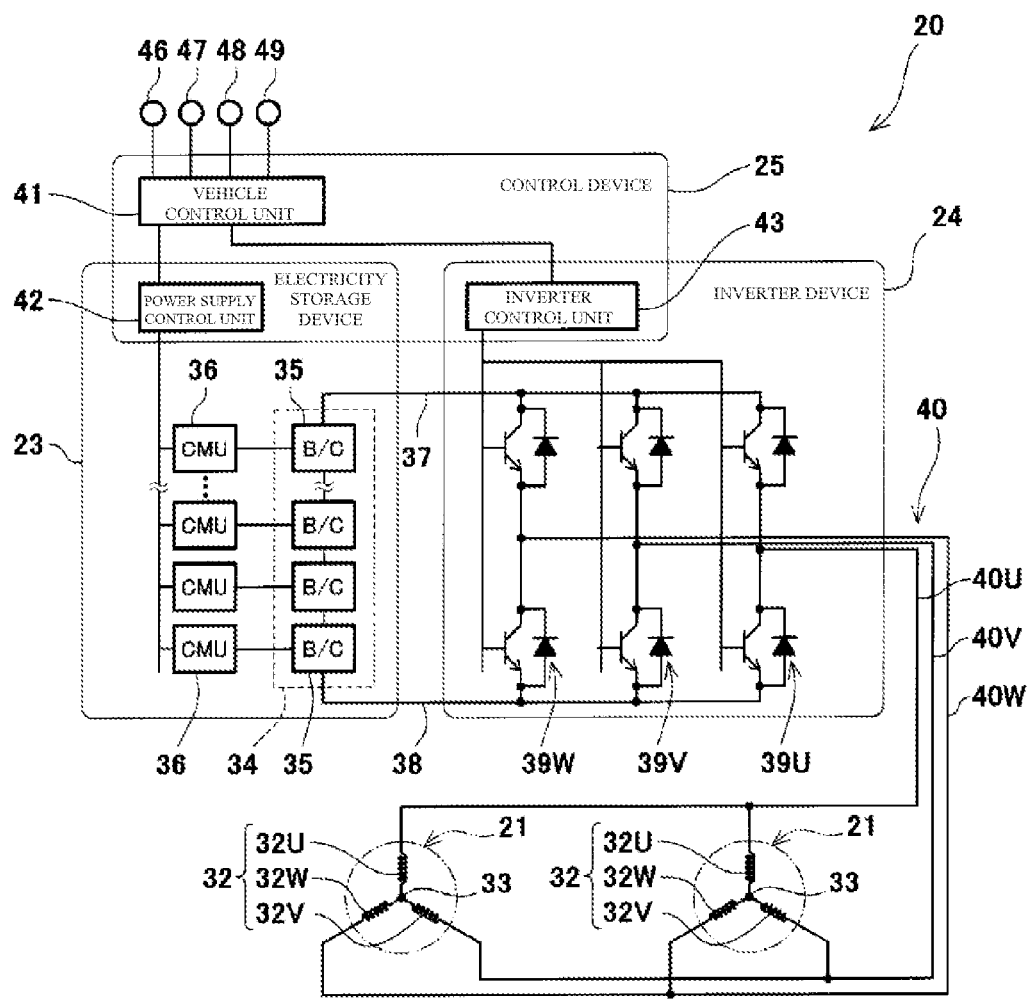
FIG. 3 is a conceptual diagram schematically illustrating an electrical configuration of the power device illustrated in FIG. 1.

FIG. 3 is a conceptual diagram schematically illustrating the mechanical configuration of the power device 20 illustrated in FIG. 1. Each electric motor 21 is provided with three-phase-circuit coils 32 including a U phase coil 32U, a V phase coil 32V, and a W phase coil 32W. In this configuration, one ends of the coils 32U, 32V, and 32W are connected in star connection form to each other via, neutral point 33. The electric motors 21 have an equal value of impedance.

The electricity storage device 23 includes a battery 34 in which multiple cells 35 capable of charging and discharging direct current are connected in series. Each cell 35 is connected to a corresponding cell monitor unit 36 (hereinafter, referred to as "CMU") and each CMU 36 monitors states (for example, the amount of stored electric energy) of the corresponding cell 35.

The inverter device 24 is connected to the battery 34 via a power line 37 and an earth line 38. Furthermore, the inverter device 24 includes a U phase arm 39U, a V phase arm 39V, and a W phase arm 39W. These arms 39U, 39V, and 39W are connected in parallel between the power line 37 and the earth line 38. Each of the arms 39U, 39V, and 39W is structured such that two arm elements, each including a switching element and a diode, are connected in series to each other. The U phase arm 39U is connected to a U phase line 40U in the midway points of the two arm elements which constitute the U phase arm 39U. The V phase arm 39V and the W phase arm 39W are connected to a V phase line 40V and a W phase line 40W, respectively in the same way. Based on control of switching between ON and OFF of a total of six switching elements, the U phase arm 39U generates U phase alternating current (AC) from direct current (DC) which is supplied through the power line 37, and this U phase alternating current is output to the U phase line 40U. Similarly, V phase alternating current generated by the V phase arm 39V is output to the V phase line 40V, and W phase alternating current generated by the W phase arm 39W is output to the W phase line 40W. Thus, the inverter device 24 converts the direct current supplied from the electricity storage device 23 into three-phase alternating currents, and outputs the three-phase alternating currents to the three-phrase lines 40 which include the U phase line 40U, the V phase line 40V, and the W phase line 40W.

The control device 25 includes a vehicle control unit 41, a power supply control unit 42, and an inverter control unit 43. The vehicle control unit 41 is connected to each CMU 36 via the power supply control unit 42, and information indicating the states of the cells 33 which is monitored by each CMU 36 is input to the vehicle control unit 41.

In addition, the vehicle control unit 41 is connected to multiple sensors which detect various states of the vehicle. Examples of these sensors include an acceleration sensor 46 which detects the amount of operation of the accelerator grip 6, a vehicle speed sensor 47 which detects the vehicle speed, a rotation speed sensor 48 which detects the number of rotations of the electric motor 21, and a current sensor 49 which detects the value of current which flows through the three-phase lines 40.

The vehicle control unit 41 is connected to each switching element of the inverter device 24 via the inverter control unit 43. The vehicle control unit 41 generates a command signal for operation of each of the arms 39U, 39V, and 39W, in response to the input, for example, from the acceleration sensor 46, and outputs the generated command signal to the inverter control unit 43. The inverter control unit 43 controls ON and OFF of each switching element according to the command signal. This control enables variable control of the current value, the frequency, and the like of the three-phase alternating currents which are output to the three-phase lines 40 according to the degree of acceleration-and-deceleration demanded by a driver.

In the present embodiment, multiple electric motors 21 are provided for one inverter device 24 and a set of three-phase lines 40. Each neutral point 33 of the multiple electric motors 21 is connected in parallel to the U phase line 40U, the V phase line 40V, and the W phase line 40W which constitute the three-phase lines 40. For this reason, the alternating current of the same frequency and the same phase which are generated by the inverter device 24 flow to each three-phase coil 32 of the multiple electric motors 21, and also the alternating current of the same voltage are applied to each three-phase coil 32. In addition, as described above, since the multiple electric motors 21 have the impedance of an equal value, the alternating current of equal current flows into each three-phase coil 32. That is, the multiple electric motors 21 operate under the same electric conditions. As is described above, since the output shaft portions 31 of the electric motors 21 are mechanically connected to the rear wheel 3 such that the electric motors 21 rotate with an equal speed change ratio, each electric motor 21 generates an equal amount of a traveling driving force and shares the traveling load equally. With this configuration, it is possible to satisfactorily suppress that each electric motor 21 interferes with operation of others. Furthermore, the inverter device 24 and the electric motor 21 are provided to have a one-to-many relation, the electric configuration in the periphery of the inverter device 24 is simplified, and high cost incurred by the inverters device 24 is suppressed.

The direct current supplied to the inverter device 24 may be secured by at most as high value as the voltage which needs to be applied to the three-phase coil 32. For this reason, the multiple electric motors 21 can be driven without a deliberate increase of the potential of the battery 34. Thereby, the number of cells 35 can be reduced, thereby achieving cutbacks in the number of CMUs 36 and in an arrangement space for the battery 34. Therefore, increases in cost and size of the electricity storage device 23 can be suppressed. Furthermore, at the same time, since the required potential of the inverter device 24 becomes lowered, it becomes unnecessary to apply an expensive switching element to the inverter device 24, reducing the cost of the inverter device 24.

Although the illustrated example is about the case where two electric motors 21 are provided, a switching circuit may be provided on the three-phase lines 40. The switching circuit switches the output state between a high driving force output state in which the current is supplied to the two electric motors 21 and a low driving force output state in which the current is supplied to either one of the two electric motors 21. In the state in which high driving force output state is not be required, such as a constant-speed traveling state, by switching to the low driving force output state by using the switching circuit, an unnecessary output can be suppressed and hence a traveling distance can be extended. For example, in the cases where an acceleration command from a driver is not given for a certain period of time, the traveling speed is constant, and the speed is high, the output state may be switched to the low driving force output state. Similarly, even in the case where three or more electric motors 21 are used, inclusion of the switching circuit Which can change the number of electric motors 21 for supplying driving current may be considered.

In the case where a regenerative function of accumulating the driving force from the driving wheel as electric power at the time of braking by using the electric motor 21 as a power generator is included, regeneration power may become superfluous when multiple electric motors 21 are used as the power generator. For example, in the case where control means determines necessary regeneration power based on the traveling state of a vehicle or an operation command, and determines that large regeneration power is needed, the circuit connection is made by the switch circuit such that the number of the electric motors 21 to serve as the power generator is increased. However, in the case where the control means determines that small regeneration power is enough, the circuit connection is made such that the number of the electric motors 21 to serve as the power generator is decreased. For example, it is determined that the large regeneration power is necessary when the amount of deceleration (brake amount) required for operation is large, but it is determined that the small regeneration power is necessary when the amount of deceleration required for operation is small.

Figure 4:
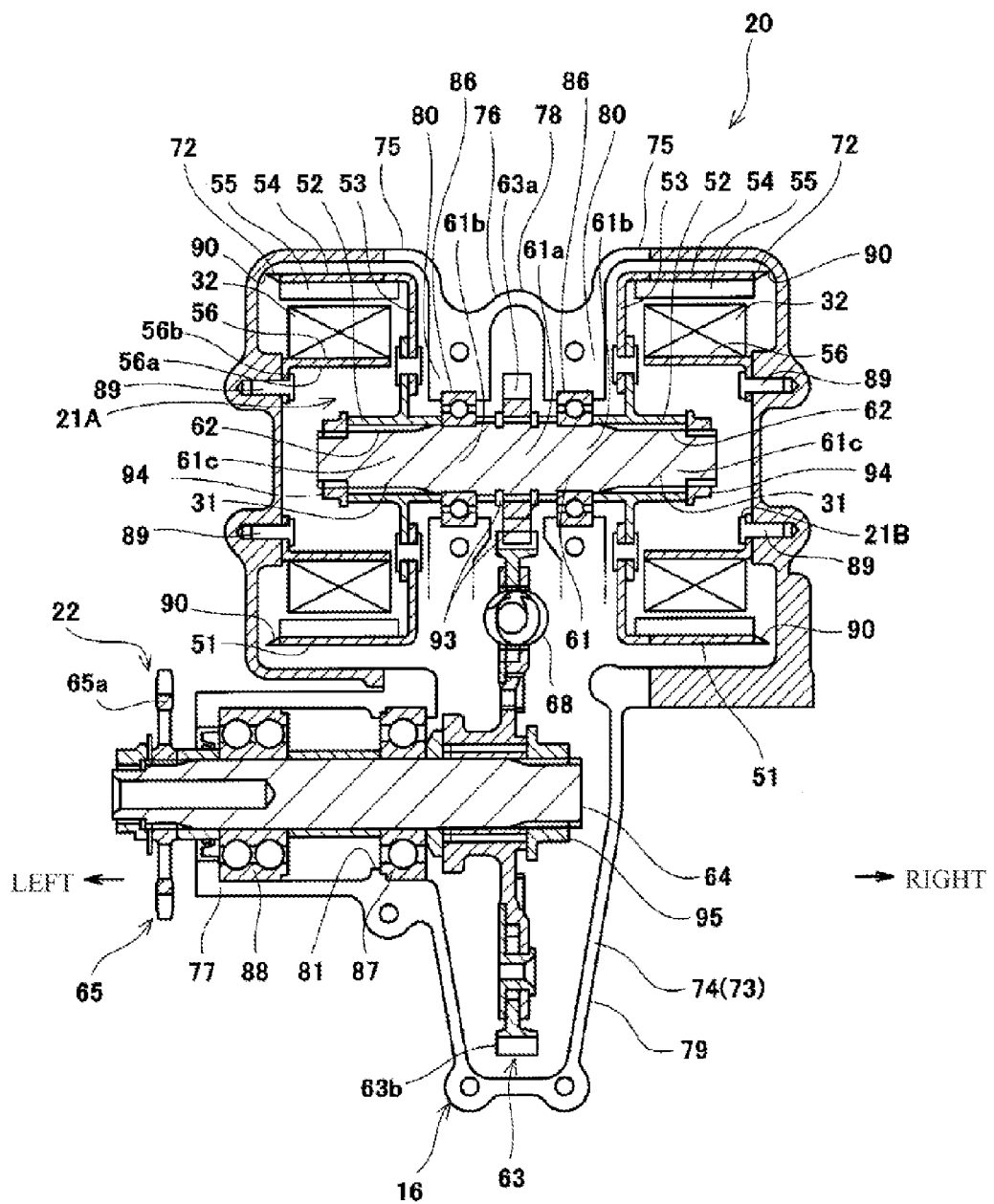
FIG. 4 is a cross-sectional view illustrating the structure of the periphery of an electric motor of the power device illustrated in FIG. 1.

Next, the driving force transmission mechanism 22 is described in detail. FIG. 4 is a cross-sectional view illustrating the structure of the periphery of the electric motor 21 of the power device 20 illustrated in FIG. 1. As illustrated in FIG. 4, the power device 20 is provided with two electric motors including a first electric motor 21A and a second electric motor 21B. Each electric motor 21 is an outer rotor type SPM motor, or a power generator, which has been applied to an engine-mounted type motorcycle, may be diverted as the electric motor 21. When driving is possible with one inverter device 24 (refer to FIG. 3), motors of other drive methods may be used. For example, an inner rotor type SPM motor may be used, and motors other than the SPM type also may be used.

Each electric motor 21 includes a rotor 51 fixed to the output shaft portion 31. The rotor 51 includes a cylinder-like boss portion 52 fixed to the output shaft portion 31 in a manner of being spline-fitted into an external circumference of the output shaft portion 31, a disk-like flange portion 53 which extends in a radial direction from the boss portion 52, and a cylinder-like circumferential wall portion 54 which extends in an axial direction from an external circumferential edge portion of the flange portion 53. An internal circumferential surface of the circumferential wall portion 54 is arranged to be distanced in the radial direction from the output shaft portion 31, and a permanent magnet 55 is affixed to the internal circumferential surface. A cylinder-like stator 56 is settled between the surface of the permanent magnet 55 and the external circumferential surface of the output shaft portion 31. A cylindrical circumferential wall portion of the stator 56 serves as a support portion 56a. The coil 32 is provided on an external circumferential surface of the cylindrical circumferential wall portion. When the three-phase alternating current flows into the coil 32 as mentioned above, and rotating magnetic field occurs, the rotor 51 will rotate by the magnetism and the output shaft portion 31 will rotate. In the case where the electric motor 21 is an outer rotor type, since the permanent magnet 55 will be pushed against the internal circumferential surface of the circumferential wall portion 54 by centrifugal force while the rotor 51 and the output shaft portion 31 are rotating, peeling of the permanent magnet 55 may be prevented. Furthermore, a large installation space for the permanent magnet 55 is securable. Yet furthermore, since a rotation radius of the rotor 51 is increased, the torque of the partial output frame 31 also increases.

The output shaft portion 31 of the first electric motor 21A and the output shaft portion 31 of the second electric motor 21B are united on the same axis, thereby forming one common output shaft 61. Spline grooves 62 each extending in an axial direction are formed in the external circumferential surface of the common output shaft 61 and the internal circumferential surface of the boss portion 52, respectively, and each boss portion 52 is spline-fitted into the common output shaft 61. Because of this configuration, a rotation phase difference between the rotor 51 of the first electric motor 21A and the rotor 51 of the second electric motor 21B corresponds to, at most, the sum of a backlash between the rotor 51 of the first electric motor 21A and the common output shaft 61 and a backlash between the rotor 51 of the second electric motor 21B and the common output shaft 61. Thus, since a mechanical rotation phase difference is very minute, the two electric motors 21A and 21B arranged on one common output shaft 61 substantially synchronize in their operations under the same electric conditions. In order to make mechanical rotation phase difference minute, the rotor 51 may be fixed to the common output shaft 61 using a key instead of the spline fitting.

In the first electric motor 21A and the second electric motor 21B, rotor inertia (rotational inertia) is equally set up. According to the present embodiment, the first electric motor 21A and the second electric motor 21B are identical in the shape of the rotors 51 and stators 56. Because of this configuration, a revolution difference between the first electric motor 21A and the second electric motor 21B may be satisfactorily prevented, and this may lead to a reduction in the number of parts.

The first electric motor 21A and the second electric motor 21B are axial-symmetrically arranged with respect to a plane which is perpendicular to an axial line, and the stators of the electric motors 21A and 21B are arranged on the outer side of the common output shaft 61. Thus, by arranging each stator 56 on the outer side of the common output shaft 61, the stator 56 can be fixed to the a motor cover 72 and a fixing portion 56*b* of the stator 56 can be easily formed as compared with the arrangement in which the stator 56 is disposed near the inner side of the common output shaft 61. The fixing unit 56*b* is a cylindrical lower wall portion of the stator 56 (in addition, in the present embodiment, a round hole is formed in the center of the cylindrical lower wall portion and the fixing unit 56*b* has a ring shape). Since the flange portion 53 of the rotor 51 is arranged near the center of the common output shaft 61, the common output shaft 61 can be decreased to a length as short as possible.

The driving force transmission mechanism 22 includes the common output shaft 61, a primary driving force transmission mechanism 63, an intermediate shaft 64, and a secondary driving force transmission mechanism 65. The intermediate shaft 64 extends in parallel with the common output shaft 61. The primary driving force transmission mechanism 63 intervenes between the common output shaft 61 and the intermediate shaft 64, and transmits rotation of the common output shaft 61 to the intermediate shaft 64. The secondary driving force transmission mechanism 64 intervenes between the intermediate shaft 64 and an axle 3*a* (refer to FIG. 2) of the rear wheel 3 (refer to FIG. 2), and transmits rotation of the intermediate shaft 64 to the axle 3*a*, According to the driving force transmission mechanism 22 configured in this way, the speed change ratio of the common output shaft 61 with respect to the rear wheel 3 is equal to the product of the speed change ratio of the primary driving force transmission mechanism 63 and the speed change ratio of the secondary driving force transmission mechanism 65. Since the common output shaft 61 is formed by the output shaft portion 31 of the first electric motor 21A and the output shaft portion 31 of the second electric motor 21B, the speed change ratios of the output shaft portions 31 of the first electric motor 21A and the second electric motor 21B with respect to the rear wheel 3 become equal to each other.

The primary driving force transmission mechanism 63 includes a primary driving element 63*a*, configured such as to rotate together with the common output shaft 61, and a primary driven element 63*b* which is driven to rotate along with the primary driving element 63*a*. In this configuration, the primary driven element 63*b* is configured such as to rotate together with intermediate shaft 64. FIG. 3 illustrates the case Where a gear mechanism is adopted as the primary driving force transmission mechanism 63, a driving gear serves as the primary driving element 63*a*, and the primary driven element 63*b* meshes with the driving gear. However, the case is just an example. That is, a chain driving force transmission mechanism or a belt driving force transmission mechanism may be adopted.

A driving force extraction position (namely, position in which the primary driving element 63*a* of the primary driving force transmission mechanism 63 is provided), from which driving force of the common output shaft 61 is extracted, is provided between the two electric motors 21A and 21B. In the present embodiment, the driving force extraction position is set to a position which is the center in the axial direction of the common output shaft 61 and is used as an axisymmetric reference point of the two electric motors 21A and 21B. By setting the driving force extraction position to the center position, distances from the electric motors 21A and 21B to the driving force extraction position can be made equal, and even when a revolution difference occurs between the two electric motors 21A and 21B, a torsion of the common output shaft 61 can be satisfactorily prevented. Bearings 86 which rotatably support the common output shaft 61 are arranged on both sides of the driving force extraction position, respectively, in the axial direction. This configuration enables the driving force extraction position, on which load tends to be applied, to be stably rotatably supported and allows a stabilized output to be obtained.

Preferably, buffering means is provided in the driving force transmission mechanism 22. The buffering means buffers a sudden change in the driving force transmitted between the common output shaft 61 and the rear wheel 3, on the downstream side of the common output shaft 61 in a driving force transmission direction. In the present embodiment, a damper spring 68 is incorporated in the driven gear serving as the primary driven element 63*a*. With this configuration, when vehicles jump or the like, the rotation change of the elements which constitute the driving force transmission mechanism 22 can be satisfactorily controlled, and the shock which is applied to the electric motors 21A and 21B from the wheels and the like can be alleviated.

In addition, the secondary driving force transmission mechanism 65 includes a secondary driving element 67 configured such as to rotate together with the intermediate shaft 64, and a secondary driven element 65*b* (refer to FIG. 2) which is driven to rotate along with the secondary driving element 65*a*. In this configuration, the secondary driven element 65*b* is configured such as to rotate together with the axle 3*a* (refer to FIG. 2). Although FIG. 2 illustrates the case where a chain driving force transmission mechanism is adopted as the secondary driving force transmission mechanism 65, and a chain is wound around the secondary driving element 65*a* serving as a driving sprocket and the secondary driven element 65*b* serving as a driven sprocket, the case is just an example. That is, a gear mechanism or a belt driving force transmission mechanism may be adopted, or a shaft drive type may be adopted.

Thus, according to the present embodiment, in the case where in a configuration in which the driving force generated by multiple electric motors is transmitted to a target traveling wheel by a driving force synthesizing mechanism, the rotation of the electric motor is slowed down and then transmitted to the corresponding traveling wheel, the outputs of the two electric motors are synthesized into one driving force by a high rotational driving force transmission mechanism portion where the rotation speed is increased to become higher than that of the driving wheel. For example, it is preferable that multiple driving forces at the output shafts of the electric motors may be synthesized, that is, the driving forces at the driving force transmission mechanism portion where the rotation speed is highest may be synthesized. In this way, by synthesizing driving forces at the high rotation speed side, the twisting force, exerted on the driving force synthesizing mechanism, which is generated due to a revolution difference between the electric motors, can be suppressed as compared with the case where the driving forces are synthesized at the low rotation speed side. When synthesizing driving forces at the high rotation speed side, the driving forces are synthesized via a bar-like shaft. In this case, rotational inertia can be suppressed as compared with the case where the driving forces are synthesized via a disk-like gear.

Thus, a mechanical mechanism which synthesizes the driving forces of the two electric motors may be just a mechanism in which rotation driving force is mechanically transmitted. And a chain mechanism, a belt mechanism, or a worm mechanism may be used besides the spline structure or gear structure.

Next, an example of the configuration of the motor case member 16 and the details of the structure of the electric motor 21 and the driving force transmission mechanism 22 are described. By referring back to FIG. 1, the motor case member 16 includes a motor housing 71 which combines half bodies 73 and 74, and a motor cover 72 which partially covers the motor housing 71 from the exterior side in the vehicle width direction. The motor housing 71 accommodates the common output shaft 61 and the intermediate shaft 64 which extend in parallel with the vehicle width direction. The half bodies 73 and 74 are parted in a direction perpendicular to axis lines of the two axes, and the parting line of the motor housing 71 appears on the exterior of the vehicle width direction.

In addition, the motor case member 16 is supported by the frame such that the common output shaft 61 is arranged above the intermediate shaft 64, and is provided on the common output shaft 61. Because of this configuration, the electric motors 21 serving as the load of a heavy weight can be arranged at a position near the main frame 8. Thus, mass concentrates on the center of gravity of the entire vehicle, which is similarly located near the main frame 8, so that steering stability may be improved. Since among portions of the motor case member 16, the size, in the vehicle width direction, of a lower portion is smaller than that of an upper portion where the two electric motors 21 are arranged in an axial direction, a bank angle which can be secured by the motorcycle 1 may be increased.

As illustrated in FIG. 4, the motor housing 71 includes a pair of left and right motor accommodation portions 75, a mechanism accommodation portion 76, and a shaft accommodation portion 77. The pair of motor accommodation portions 75 is formed in a substantially cylindrical shape, and is arranged mutually on the same axial line. Each motor accommodation portion 75 has a circular opening at an external end portion thereof in the axial direction, and the motor cover 72 is provided in a manner of covering the opening. The mechanism accommodation portion 76 includes a driving side accommodation portion 78 provided between the left and right motor accommodation portions 75, and a driven side accommodation portion 79 which is provided such as to protrude outward in a radial direction of the motor accommodation portion 71 when viewed in the axial direction. The driving side accommodation portion 78 is adjacent to each motor accommodation portion 75 via a pair of left and right barrier walls 80. The driving side accommodation portion 78 and the driven side accommodation portion 79 have a circular cross-section when viewed in the axial direction, and the inside of the driving side accommodation portion 78 communicates with the inside of the driven side accommodation portion 79. Therefore, the mechanism accommodation portion 75 is formed in an approximately guitar shape in which two circles having different center positions cross each other at two points when viewed from the axial direction. A through-hole 81 is formed in a center portion of a left wall of the driven side accommodation portion 79. The shaft accommodation portion 77 has an approximately cylindrical shape, and protrudes toward the left side from the external circumferential edge of the through-hole 81 in the external surface of the left wall.

The common output shaft 61 includes a mechanism installation portion 61*c* to which the primary driving element 63*a* is fixed, a pair of journal portions 61*b* located on both sides of the mechanism installation portion 61*a* in the axial direction, and a pair of motor installation portions 61*c* located at leading end sides of the journal portions 61*b*, respectively, in the axial direction. Each journal portion 61*b* is rotatably supported by the bearing 86 which is installed in the barrier wall 80 to be unmovable in the axial direction. For this reason, the mechanism installation portion 61*a* and the primary driving element 63*a* are accommodated together in the driving side accommodation portion 78 of the mechanism accommodation portion 76. The pair of motor installation portions 61*c* are accommodated in a space defined by the barrier wall 80, the motor accommodation portion 75, and the motor cover 72.

The intermediate shaft 64 is rotatably supported by the bearing 87 provided in the internal diameter side of the through-hole 81, and the bearing 88 provided in the inside of the shaft accommodation portion 77. A right end portion of the intermediate shaft 64 passes through the through-hole 81 and projects inside the driven side accommodation portion 79, and the primary driven element 63*b* of the primary driving force transmission mechanism 63 is fixed to the right end portion. A left end portion of the intermediate shaft 64 projects outside the shaft accommodation portion 77, and the secondary driving element 65*a* of the secondary driving force transmission mechanism 65 is fixed to the left end portion.

The spline groove 62 is formed in the motor installation portion 61*c*, and the rotor 51 of the electric motor 21 is spline-fitted into the motor installation portion 61*c* and accommodated in the above-mentioned space. The rotor 51 is provided in the state in which the flange portion 53 is located at a center portion in the axial direction, and has approached the barrier wall 80. The stator 56 of the electric motor 21 is fastened to an internal surface of the motor cover 72 by using a stator bolt 89, and is provided such as to protrude toward the center portion in the axial direction from the internal surface of the motor cover 72. In this way, the stator 56 is settled on the internal circumference side of the rotor 51.

Here, although a leading end portion of the circumferential wall portion 54 in the axial direction defines a bowl-shaped opening of the rotor 51, multiple fins 90 are arranged in the circumferential direction in the leading end portion at intervals. For this reason, the rotation of the rotor 51 agitates air around the leading end portion of the circumferential wall portion 84 of air within the space. This agitation can forcedly air-cool the electric motor 21.

The two electric motors 21A and 21B are arranged at the both sides in the vehicle width direction. For this reason, since the two electric motors 21A and 21B may become easily cooled by a traveling wind when the motor case member is supported by the frame, the temperature rise of the coils and the like may be suppressed. In the present embodiment, since each opening of the two rotors are arranged to face outward in the vehicle width direction, the coils provided in the stators can be arranged on outer sides in the vehicle width direction, thereby suitably suppressing the temperature rise of the coils by air-cooling. In addition, since the support portion 56*a* of the stator 55 which supports the coil 32 is connected to the case member with which the traveling air collides in a heat conductible manner, the heat generated from the coil 32 is transferred to the case member which is cooled by the traveling wind via the support portion 56*a*. In this way, the temperature rise of the coil 32 can be further suppressed.

Next, the procedure of assembling the motor case member 16 of the above-described configuration, the electric motor 21, and the driving force transmission mechanism 22 are described. In advance, the primary driving element 63*a* is fitted into the mechanism installation portion 61*a* of the common output shaft 61, the primary drive element 63*a* is pinched in the axial direction between a pair of C clips 93, the bearing 86 is fitted into each journal portion 61*b*, the rotor 51 is spline-fitted into the motor installation portion 61*c*, and a nut 94 is temporarily fastened to the leading end portion of the motor installation portion 61*c*. The bearings 87 and 88 are fitted into the intermediate shaft 64. The stator 56 and a passage member 92 are attached to the internal surface of the motor cover 72.

Subsequently, the common output shaft 61 is attached to either one of the pair of half bodies 73 and 74, together with the rotor 51 and the primary driving element 63*a* by fitting the bearing 86 into the barrier wall 80 of either corresponding half body. The intermediate shaft 64 is attached to the one corresponding half body by fitting the bearings 87 and 88 into the through-hole 81 and the shaft accommodation portion 77, respectively. Subsequently, the primary driven element 63*b* is fitted into the right end portion of the intermediate shaft 64 while engaging with the primary driving element 63*a*, and the nut 95 is fastened to the right end portion of the intermediate shaft 64.

Subsequently, the one half body is assembled with the other half body. Thus, the circular opening of the motor accommodation portion is formed. Subsequently, since the motor accommodation portion 75 has an opening, an accessible nut 94 is fastened. Thus, the boss portion 52 is pinched between the nut 94 and the bearing 86, and the rotor 51 is positioned in the axial direction. Subsequently, the motor cover 72 is attached to the motor accommodation portion 75 in a manner of covering the opening. Thus, since the bowl-shaped rotor 51 is arranged such that the opening faces outward in the axial direction, the stator 56 is inserted and settled inside the internal circumferential surface of the rotor 51 only by attaching the motor cover 72 in this way. When attaching the motor cover 72 to the motor accommodation portion 75, a positioning mechanism (not illustrated) which positions the motor cover 72 on the motor accommodation portion 75 along the circumferential direction is used. Through this assembly procedure, a first passage 91*a* provided in the motor housing 71 can be easily made to communicate with a second passage 91*b* provided in the motor cover 72, and a coolant passage 91 can be simply formed.

Furthermore, since the primary driving force transmission mechanism 63 and the intermediate shaft 64 are accommodated in the motor case member 16, the lubrication between the electric motor 21 and the common output shaft 61 and the lubrication for the primary driving force transmission mechanism 63 are performed in the same case member. Thus, the configuration of a lubricating system can be simplified. In the present embodiment, the mechanism accommodation portion 76 in which the primary driving force transmission mechanism 63 is accommodated is located at the center portion in the axial direction, and the motor accommodation portions 75 for accommodating the electric motors 21 are provided at both sides of the mechanism accommodation portion 76 in the axial direction. For this reason, the lubrication between the electric motor 21 and the common output shaft 61 and the lubrication for the primary driving force transmission mechanism 63 can be achieved with use of a simple structure in which lubricating oil is supplied to the motor accommodation portion 75 via the mechanism accommodation portion 76.

Second Embodiment

Figure 5:
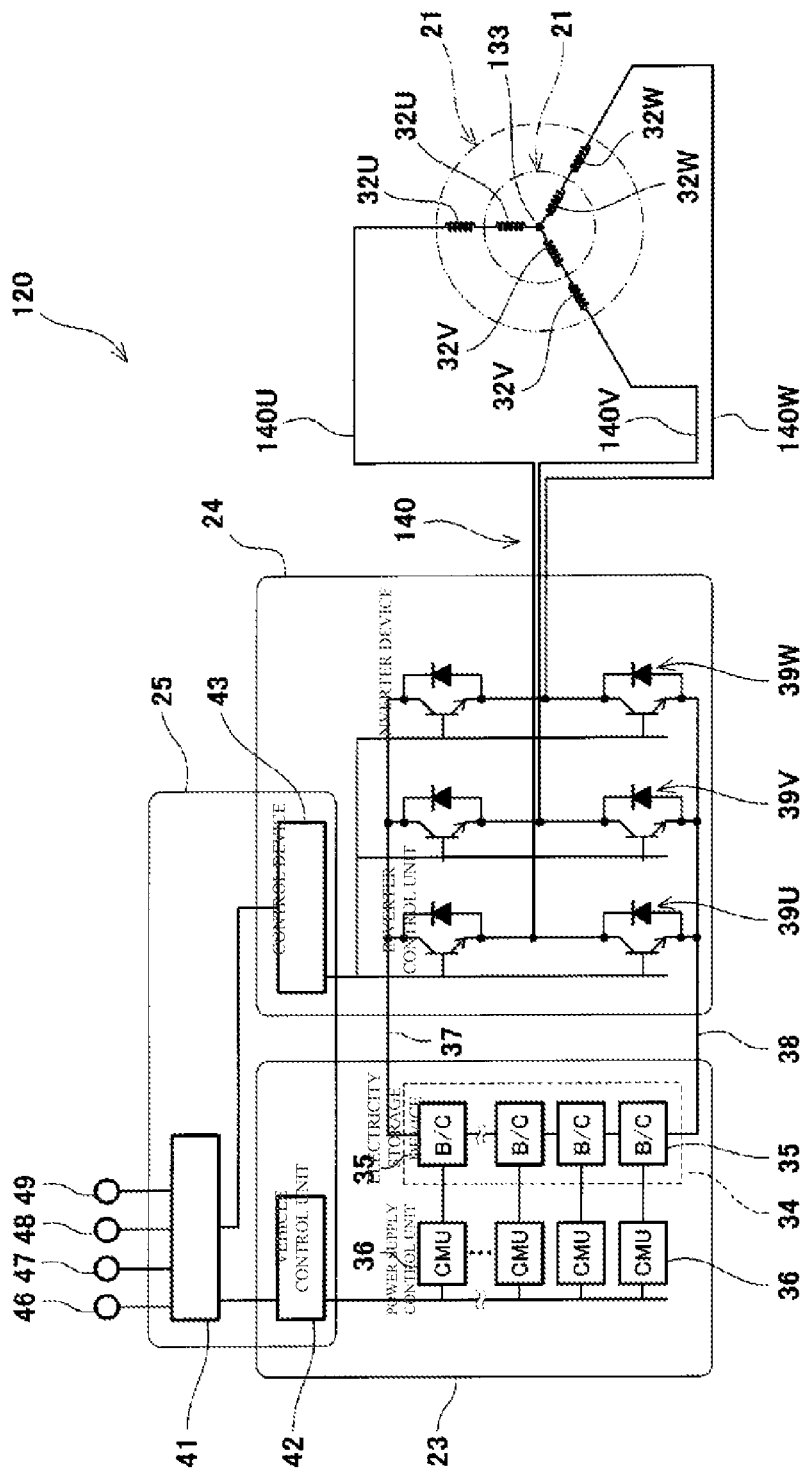
FIG. 5 is a conceptual diagram schematically illustrating an electrical configuration of a power device according to a second embodiment of the present invention.

FIG. 5 is a conceptual diagram schematically illustrating an electrical configuration of a power device 120 according to a second embodiment of the present invention. According to the first embodiment, the coils of the same phase within the multiple electric motors 21 are connected in parallel to the corresponding lines among three-phase lines 40. However coils of the same phase may be connected in series to each other as illustrated in FIG. 5. That is, ends of a U phase line 140U, a V phase line 140V, and a W phase line 140W which constitute the three-phase lines 140 may be connected to one neutral point 133 in a star connection format, multiple U phase coils 32U may be connected in series to each other on the U phase line 140U, multiple V phase coils 32V may be connected in series to each other on the V phase line 140V, and multiple W phase coils 32W may be connected in series to each other on the W phase line 140W. Even when an electric configuration is changed in this way, it is possible to satisfactorily suppress each electric motor 21 from interfering with operation of others while maintaining a configuration in which an inverter device 24 and the electric motors 21 are provided in one-to-many correspondence relation.

Third Embodiment

Figure 6:
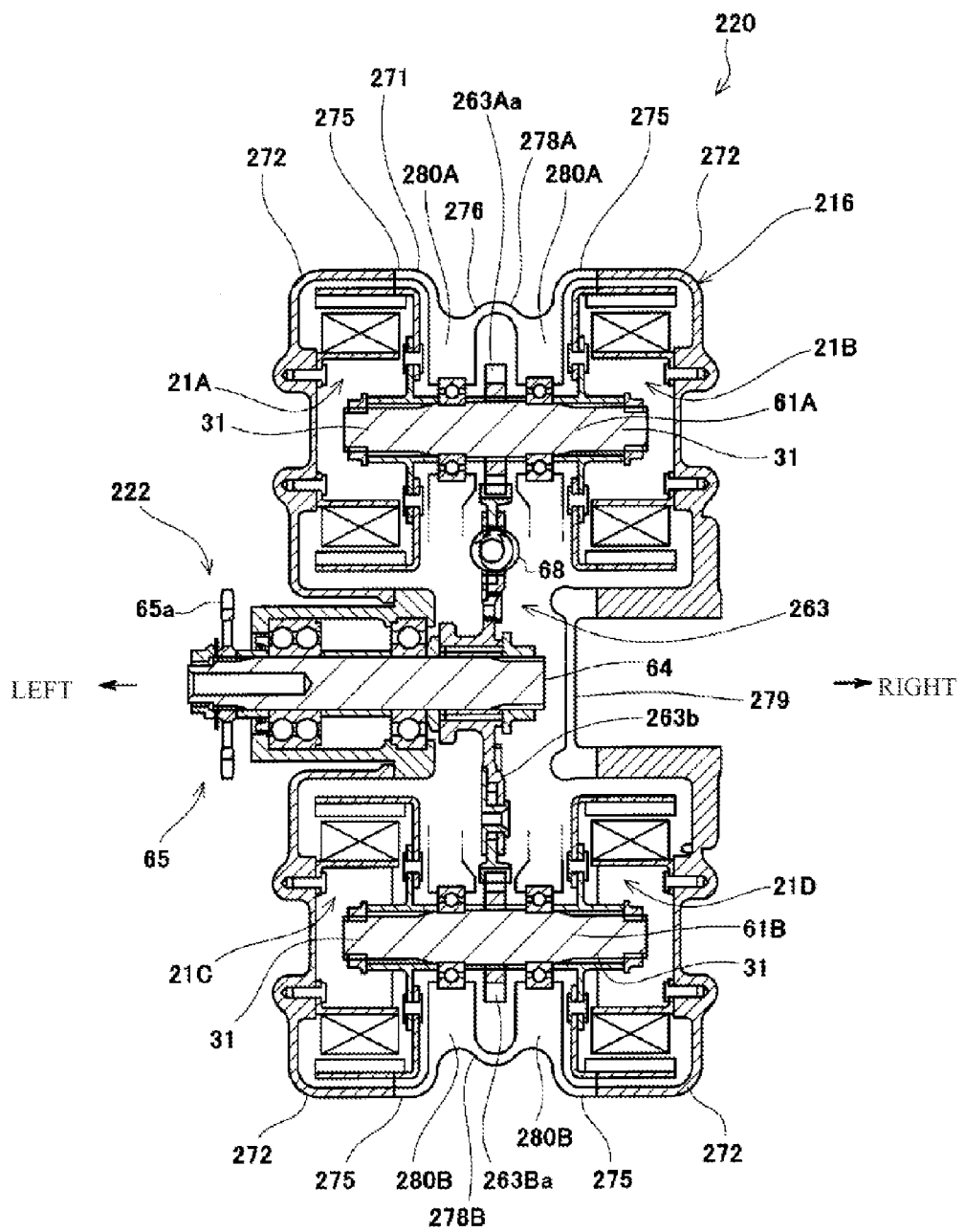
FIG. 6 is a cross-sectional view illustrating the structure of the periphery of an electric motor of a power device according to a third embodiment of the present invention.

FIG. 6 is a cross-sectional view illustrating the structure of the periphery of an electric motor of a power device 220 according to a third embodiment of the present invention. As illustrated in FIG. 6, the power device 220 according to the present embodiment includes four electric motors including a first electric motor 21A, a second electric motor 21B, a third electric motor 21C, and a fourth electric motor 21D, and all the electric motors 21 are the same outer rotor type SPM motors as the first embodiment.

Output shaft portions 31 of the first electric motor 21A and the second electric motor 21B are united to form one common output shaft (hereinafter, referred to as "first common output shaft 61A") like in the first embodiment. Output shaft portions 31 of the third electric motor 21C and the fourth electric motor 21D are united to form a second common output shaft 61B like the first common output shaft 61A (namely, the common output shaft 61 of the first embodiment).

A driving force transmission mechanism 222 includes the two common output shafts 61A and 61B, a primary driving force transmission mechanism 263, an intermediate shaft 64 which is similar to that of the first embodiment, and a secondary driving force transmission mechanism 65. The first common output shaft 61A, the second common output shaft 61B, and the intermediate shaft 64 extend in parallel with each other.

The primary driving force transmission mechanism 263 intervenes between the intermediate shaft 64 and the first common output shaft 61A and between the intermediate shaft 64 and the second common output shaft 61B, and transmits rotation of the first common output shaft 61A to the intermediate shaft 64 and rotation of the second common output shaft 61B to the intermediate shaft 64. Therefore, the primary driving force transmission mechanism 263 includes a primary driven element 263*b* similar to that of the first embodiment, a first primary driving element 263Aa fixed to a mechanism installation portion 61Aa of the first common output shaft 61A, and a second primary driving element 263Ba fixed to a mechanism installation portion 61Ba of the second common output shaft 61B. The primary driven element 263b is driven to rotate by the two primary driving elements 263Aa and 263Ba. The primary driving force transmission mechanism 263 is configured such that a speed change ratio of each common output shaft 61A, 61B with respect to the intermediate shaft 64 is equal to each other. Because of this configuration, like the first embodiment, the speed change ratio of each output shaft portion 31 of the four electric motors 21 with respect to rear wheel 3 (refer to FIG. 1) becomes equal to each other, and the four electric motors 21 may substantially synchronize in operation. In addition, the four electric motors are divided into two groups, and two electric motors which constitute each group are formed on one common output shaft. By this configuration, although four electric motors 21 are provided, the power device 220 can be made compact in an axial direction.

A mechanism accommodation portion 276 of a motor housing 271 of a motor case member 216 includes a driven side accommodation portion 279 similar to that of the first embodiment, a first driving side accommodation portion 278A which accommodates the first primary driving element 263Aa, and a second driving side accommodation portion 278B which accommodates the second primary driving element 263Ba. The first driving side accommodation portion 278A and the second driving side accommodation portion 278B are adjacent to the driven side accommodation portion 279 in a radial direction, and distanced from each other in a circumferential direction. The inside of the driven side accommodation portion 279 communicated with the inside of each of the first driving side accommodation portion 278A and the second driving side accommodation portion 278B. Left and right motor accommodation portions 275 similar to those of the first embodiment are provided at both sides of the first driving side accommodation portion 278A in the axial direction with a barrier wall 280A interposed therebetween. The left and right motor accommodation portions 275 similar to those of the first embodiment are also provided at both sides of the second driving side accommodation portion 278B in the axial direction with a barrier wall 280B interposed therebetween.

Figure 7:
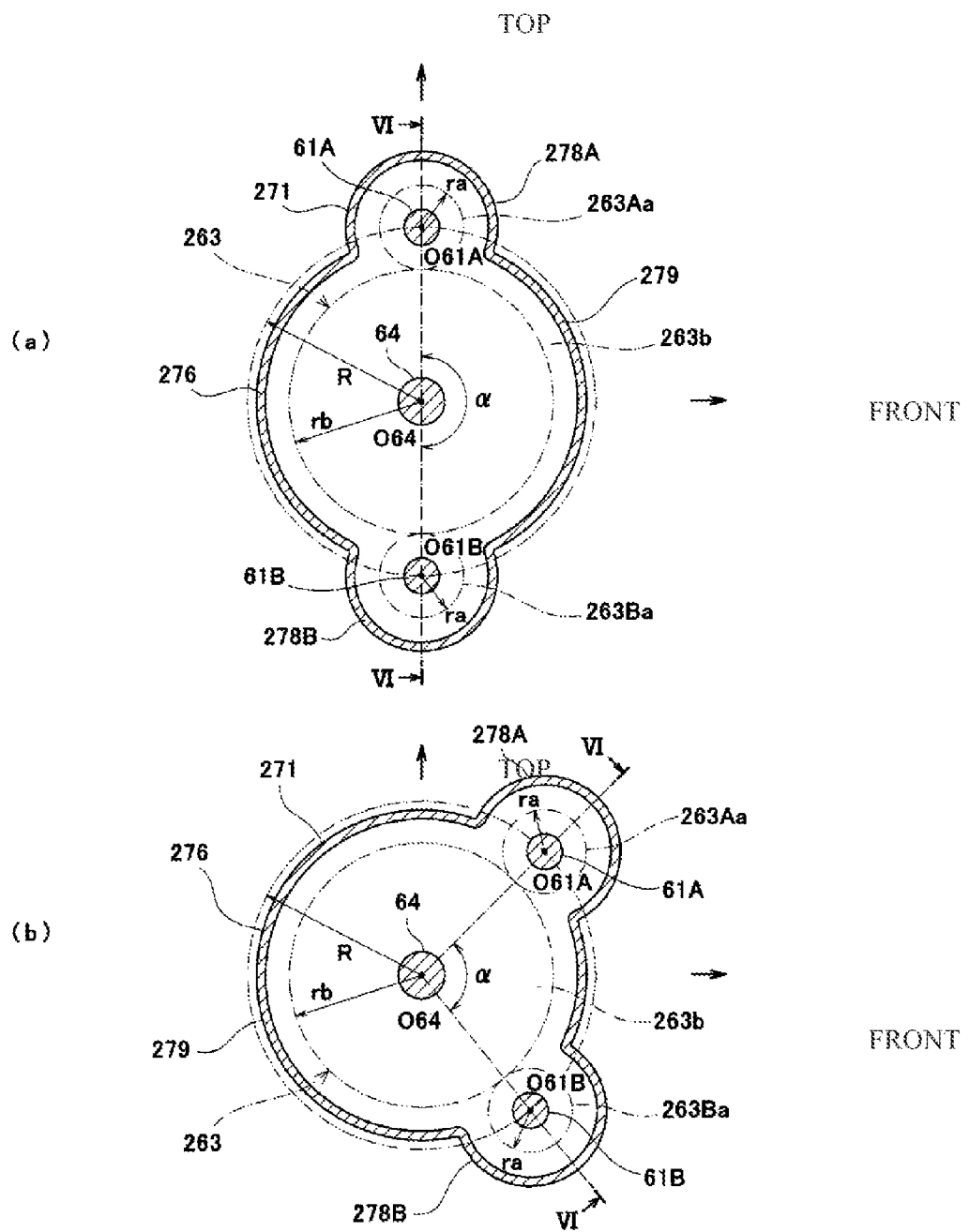
FIG. 7(a) is a side view illustrating an example of a motor housing of the power device illustrated in FIG. 6.
FIG. 7(b) is a side view illustrating a modification of the motor housing.

FIG. 7(a) is a side view illustrating an example of the motor housing 271 of the power device 220 illustrated in FIG. 6, and FIG. 7(b) is a side view illustrating a modification thereof. The cross section illustrated in FIG. 6 is obtained not only when it is taken along a line VI-VI illustrated in FIG. 7(a) but also when it is taken along a line VI-VI illustrated in FIG. 7(b). Here, the description is made with an example in which the primary driving force transmission mechanism 263 is a gear mechanism, and the first primary driving element 263Aa and the second primary driving element 263Ba have the same diameter and the same number of teeth.

As illustrated in FIGS. 7(a) and 7(b), an axial center O61A of the first common output shaft 61A, and an axial center O61B of the second common output shaft 61B are located on the circumference of a circle having a radius R which is equal to the sum of a pitch radius rb of the primary driven element 263b and a pitch radius ra of the primary driving elements 263Aa and 263Ba with respect to an axial center O64 of the intermediate shaft 64. An angle α formed by a line which connects the axial center O64 of the intermediate shaft 64 and the axial center O61A of the first common output shaft 61A, and a line which connects the axial center O64 of the intermediate shaft 64 and the axial center O61B of the second common output shaft 61B can be suitably changed. The first common output shaft 61A, the second common output shaft 61B, and the intermediate shaft 64 may be arranged such that the angle α is 180° (refer to FIG. 7(a)), or may be arranged such that the angle α is an angle other than 180° (refer to FIG. 7(b)).

As illustrated in FIG. 7(a), when multiple electric motors are arranged at equal intervals in the circumferential direction, a torsion which occurs in the intermediate shaft can be suppressed and the intermediate shaft can be smoothly rotated. In the case where multiple electric motors are arranged with at unequal intervals in the circumferential direction as illustrated FIG. 7(b), by arranging a portion in which the interval is relatively small on the front side, interference between the motor case member and a swing arm can be prevented, and a space in a portion, which is located ahead of a pivot frame and which laterally overlaps a down frame, can be effectively used. When the portion in which the interval is relatively small is arranged on the upper side, a bank angle is increased to allow a turning travel.

Fourth Embodiment

Figure 8:
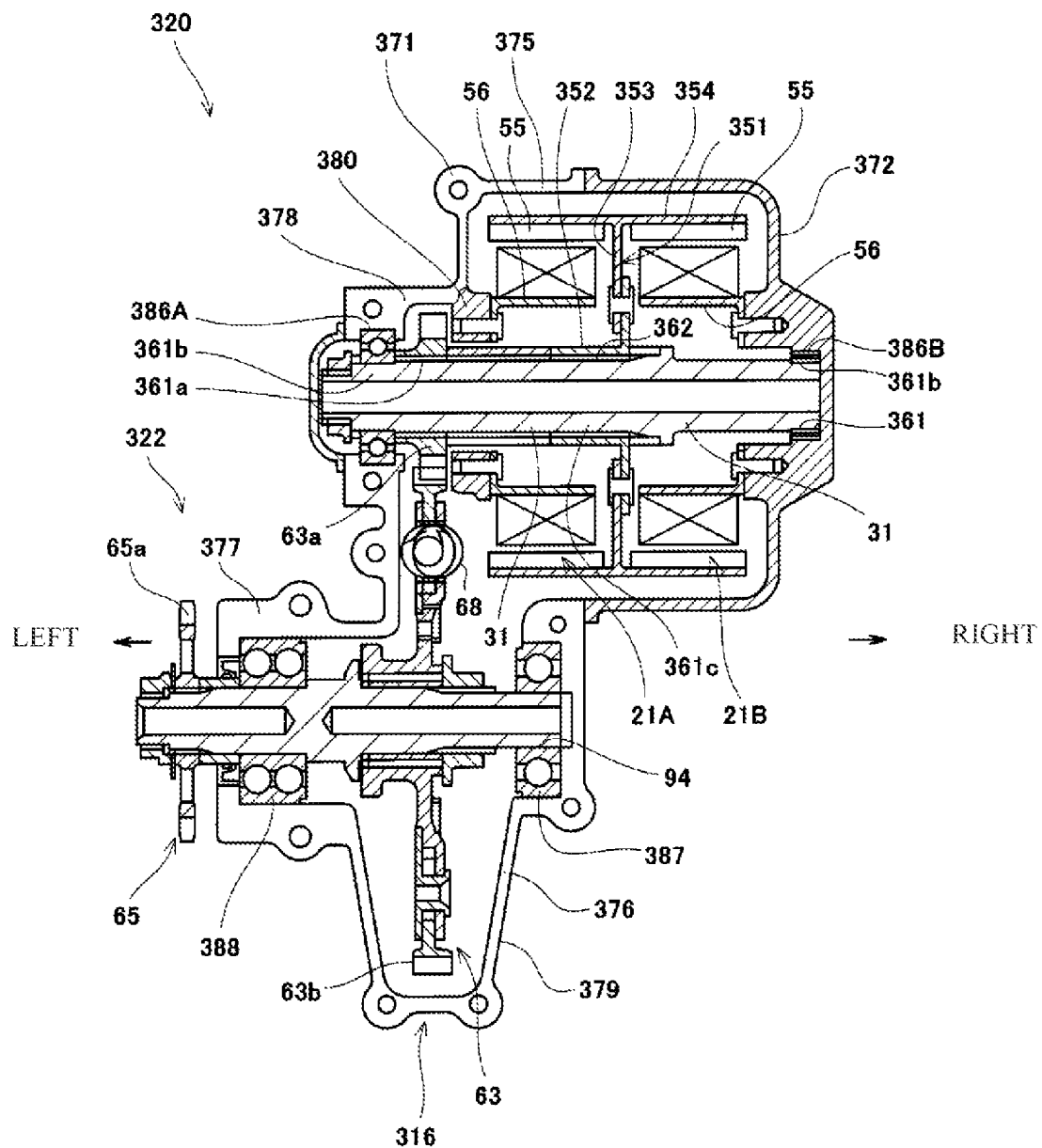
FIG. 8 is a cross-sectional view illustrating the structure of the periphery of an electric motor of a power device according to a fourth embodiment of the present invention.

FIG. 8 is a cross-sectional view illustrating the structure of the periphery of an electric motor of a power device 320 according to a fourth embodiment of the present invention. As illustrated in FIG. 8, the power device 320 according to the present embodiment includes two electric motors including a first electric motor 21A and a second electric motor 21B. The two electric motors 21A and 21B are the same outer rotor type SPM motors as the first embodiment. Each output shaft portion 31 of the first electric motor 21A and the second electric motor 21B is united to form one common output shaft 361. A driving force transmission mechanism 322 includes the one common output shaft 361, a primary driving force transmission mechanism 63 similar to that of the first embodiment, an intermediate shaft 64, and a secondary driving force transmission mechanism 65. It is configured such that a speed change ratio of each output shaft portion 31 with respect to a rear wheel 3 (refer to FIG. 1) is equal to each other.

The common output shaft 361 includes a mechanism installation portion 361a to which a primary driving element 63a of a primary driving force transmission mechanism 63 is attached, a pair of journal portions 361b, and a single motor installation portion 361c in which a spline groove 362 is formed. The pair of journal portions 361b are provided on both sides of the common output shaft 361, and a mechanism installation portion 361a is adjacent to the right side of a left-side journal portion 361b. The motor installation portion 361c is provided between a mechanism installation portion 361a and a right-side journal portion 361b.

Rotors of the first electric motor 21A and the second electric motor 21B function as an integrated rotating body 351, and the one rotating body 351 is spline-fitted into one motor installation portion 361c. The rotating body 351 combines a boss portion 352 and a flange portion 353. Circumferential wall portions 354 extend from an external circumferential edge portion of the combined flange portion 353 toward both sides thereof in an axial direction (left-to-right direction), a permanent magnet 55 of the first electric motor 21A is attached on an internal circumferential surface of the portion which extends to the left side, and a permanent magnet 55 of the second electric motor 21B is attached to an internal circumferential surface of the portion which extends to the right side. In this way, since the boss portion is combined, a mechanical rotation phase difference between the rotors can be eliminated, the synchronization of the first electric motor 21A and the second electric motor 21B can be further improved. Furthermore, since the flange portion is combined, two electric motors can be arranged to be compact in the axial direction. Yet furthermore, rotational inertia can be equally set for the left and right electric motors.

A mechanism accommodation portion 376 of a motor housing 371 of a motor case member 316 includes a driving side accommodation portion 378 and a driven side accommodation portion 379 similar to those of the first embodiment. A shaft accommodation portion 377 of the motor housing 371 protrudes from the driven side accommodation portion 379 toward the left side. A motor accommodation portion 375 of the motor housing 371 is adjacent to the right side of a driving side accommodation portion 377 via a barrier wall 380. Each motor accommodation portion 375 has a circular opening at an end portion thereof in the axial direction, and a motor case member 372 is attached to the motor housing 371 in a manner of blocking the opening.

The journal portion 361b on the left side of the common output shaft 361 is rotatably supported by a bearing 386a attached to the driving side accommodation portion 376, and the journal portion 361b on the right side is rotatably supported by a bearing 386B attached to an internal surface of the motor cover 372. Thus, the mechanism installation portion 361a and a primary driving element 63a are accommodated in a driving side accommodation portion 378, and the motor installation portion 361c and the rotating body 351 are accommodated in the motor accommodation portion 375. A stator 56 of the first electric motor 21A is fastened to a right side end surface of the barrier wall 380, and a stator 56 of the second electric motor 21B is fastened to the internal surface of the motor cover 372. In this way, even when a boss portion 351 and a flange portion 353 are combined, each stator 56 can be settled using the barrier wall 380 and the motor cover 372. In addition, a right end portion of the intermediate shaft 64 is rotatably supported by a bearing 387 attached to an internal surface of the right side wall of the driven side accommodation portion 378, and a left end portion of the intermediate shaft 64 is rotatably supported by a hearing 388 accommodated in the shaft accommodation portion 377.

According to the present embodiment, since a driving force extraction position where rotation of the common output shaft 361 is extracted is arranged at an end portion (left end portion in the illustrated example) of the common output shaft, two electric motors 21A and 21B provided on the common output shaft 361 can be arranged at the other side (right side in the illustrated example) of the common output shaft. For this reason, since two electric motors 21A and 21B can be arranged to deviate from the center in a vehicle width direction, a weight balance between the side where the two electric motors are arranged and the other side where other parts are arranged can be obtained.

Fifth Embodiment

Figure 9:
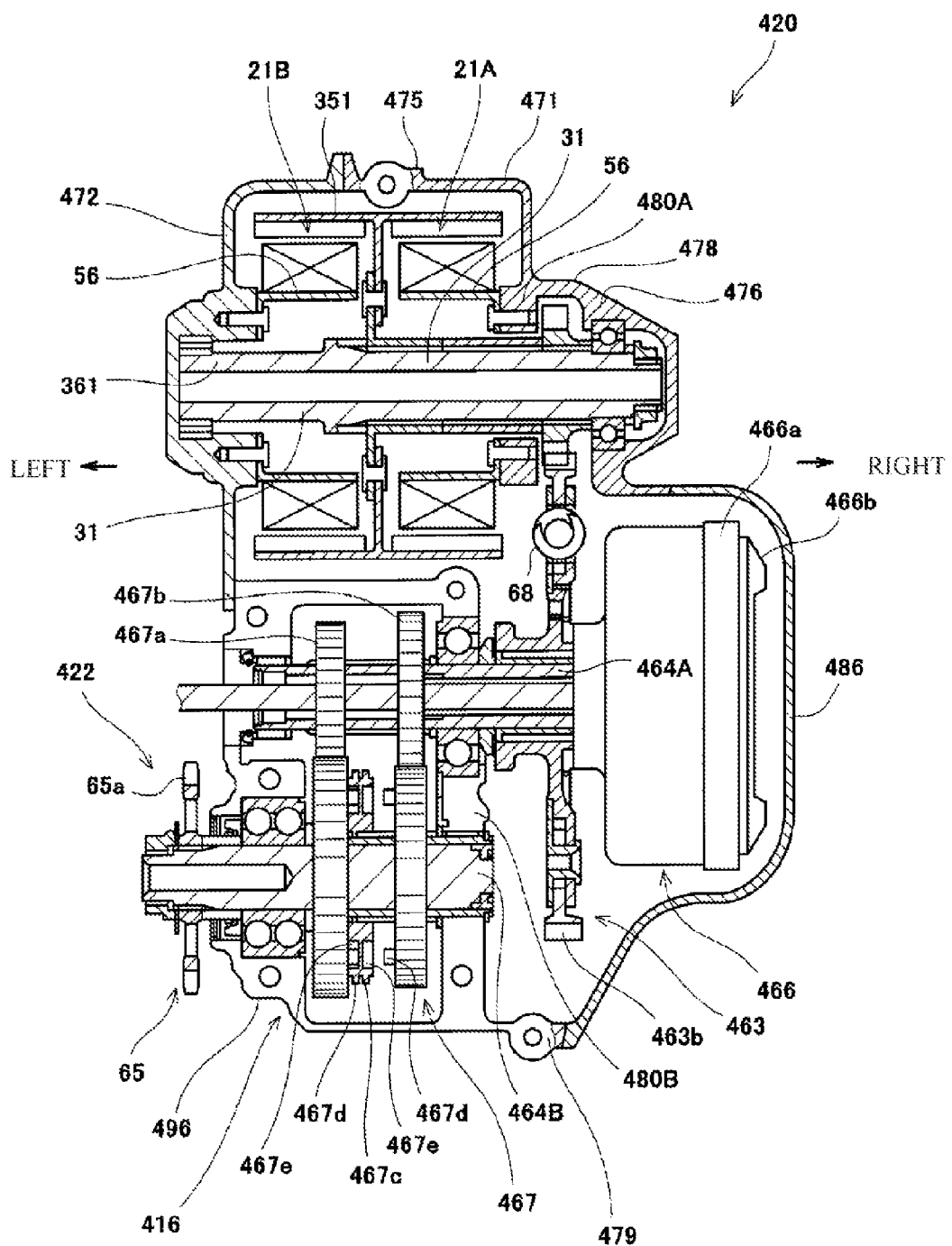
FIG. 9 is a cross-sectional view illustrating the structure of the periphery of an electric motor of a power device according to a fifth embodiment of the present invention.

FIG. 9 is a cross-sectional view illustrating the structure of the periphery of an electric motor of a power device 420 according to a fifth embodiment of the present invention. As illustrated in FIG. 9, the power device 420 according to the present embodiment includes two electric motors including a first electric motor 21A and a second electric motor 21B in a similar manner to the fourth embodiment. The two electric motors are outer rotor type SPM motors. Each output shaft portion 31 function as one common output shaft 361. The rotors function as an integrated rotating body 351.

A driving force transmission mechanism 422 includes one common output shaft 361, a primary driving force transmission mechanism 463, a clutch 466, a first intermediate shaft 464A, a gear transmission mechanism 467, a second intermediate shaft 464B, and a secondary driving force transmission mechanism 65. The common output shaft 361 extends in parallel with the first intermediate shaft 464A and the second intermediate shaft 464B.

A first driven element 463b of the primary driving force transmission mechanism 463 is constituted such as to rotate together with an input element 466a of the clutch 466. The clutch 466 is provided in an end portion (right end portion in the illustrated example) of the first intermediate shaft 464A in the axial direction, and includes the input element 466a, an output element 466b configured in a manner of rotating together with the first intermediate shaft 464A, and friction plates (not illustrated) provided in the input element 466a and the output element 466B. Rotation of the common output shaft 361 is input to the input element 466a via the primary driving force transmission mechanism 463. When a clutch lever (not illustrated) is operated, the friction plate for the input element 466a is separated from the friction plate of the output element 466b, so that rotation of the common output shaft 361 may not be transmitted to the first intermediate shaft 464A. When the clutch lever is not operated, the friction plate for the input element 466a engages with the friction plate of the output element 466b, so that the rotation of the common output shaft 361 may be transmitted to the first intermediate shaft 464A.

The gear transmission mechanism 467 is a 2-step manual gearshift of a parallel shaft type. That is, a first gearshift gear train 467a and a second gearshift gear train 467b having different speed change ratios intervene between the first intermediate shaft 464A and the second intermediate shaft 464B. Each gearshift gear train 467a, 467b includes a driving gear which rotates together with the first intermediate shaft 464A like one body and a driven gear which meshes with the driving gear and is provided on the second intermediate shaft 464B such that it can rotate in a relative manner. A sleeve 467c is provided between the driven gears of the gearshift gear trains 467a and 467b. The sleeve 467c rotates together with the second intermediate shaft 464B, and is movable along the axial direction. With regard to the driven gear, while dog gear teeth 467d are formed in an end surface where the sleeve 467c is arranged, and engagement holes 467e with which the dog gear teeth 467d can engage are formed on both surfaces of the sleeve 467c in the axial direction. A shift lever (not illustrated) operated by a driver is attached to the sleeve 467c, and the position of the sleeve 467c in the axial direction is changed over a first gear position, a second gear position, and a neutral position in response to driver's operation. When the sleeve 467c is in the first gear position, the dog gear tooth 467d of the driven gear of the first gearshift gear train 467a engages with engagement hole 467e, and the rotation of the first intermediate shaft 464A changes to a first speed change ratio via the first gearshift gear train 467a, and is then transmitted to the second intermediate shaft 464B. When the sleeve 467c is in the second gear position, the dog gear tooth 467d of the driven gear of the second gearshift gear train 467b engages with the engagement hole 467e, and the rotation of the second intermediate shaft 464B changes to a second speed change ratio different from the first speed change ratio via the second gearshift gear train 467b and is transmitted to the second intermediate shaft 464B. When the sleeve 467c is located in the neutral position, the dog gear tooth 467d of any driven gear does not engage with the engagement hole 467e, and the rotation of the first intermediate shaft 464A is not transmitted to the second intermediate shaft 464B.

In the present embodiment, the speed change ratio of the common output shaft 461 with respect to the rear wheel (refer to FIG. 1) is equal to the product of the speed change ratio of the secondary driving force transmission mechanism 65, the speed change ratio chosen by the gear transmission mechanism 467, and the speed change ratio of the primary driving force transmission mechanism 464. Since the common output shaft 461 serves as the output shaft portion 31 of the first electric motor 21A and the output shaft portion 31 of the second electric motor 21B, the speed change ratios of the output shaft portions 31 of the first electric motor 21A and the second electric motor 21B with respect to the rear wheels 3 can be made equal to each other. Furthermore, a driver can change the speed change ratio according to a traveling condition.

The motor housing 471 of the motor case member 416 has a driven side accommodation portion 479 similar to that of the first embodiment. A transmission accommodation portion 496 is adjacent to the left side of the driven side accommodation portion 479 via the barrier wall 480B. A left side portion of the first intermediate shaft 464A, the transmission mechanism 467, and the second intermediate shaft 464B are accommodated in the transmission accommodation portion 496. The motor accommodation portion 475 of the motor housing 471 is provided such as to be near the transmission accommodation portion 496 in the radial direction. A left portion of the motor accommodation portion 475 of the motor housing 471 has an opening, and the motor cover 472 is provided in a manner of covering the opening in the left portion. A stator 56 of the first electric motor 21A is fixed to the barrier wall 480A, and a stator 56 of the second electric motor 21B is fixed to the internal surface of the motor cover 472. On the other hand, a right portion of the driven side accommodation portion 479 of the motor housing 471 has an opening, a clutch cover 486 is provided in a manner of covering the opening located in the right portion, and hence the clutch 466 is accommodated in the motor case member 416. In this way, since viewed from the mechanism accommodation portion 476 including the driving side accommodation portion 478 and the driven side accommodation portion 479, the motor accommodation portion 475 and the transmission accommodation portion 496 are arranged on the same side (left side in the illustrated example) with respect to the axial direction, the motor case member 416 can be configured to be compact as a whole in the axial direction.

Sixth Embodiment

Figure 10:
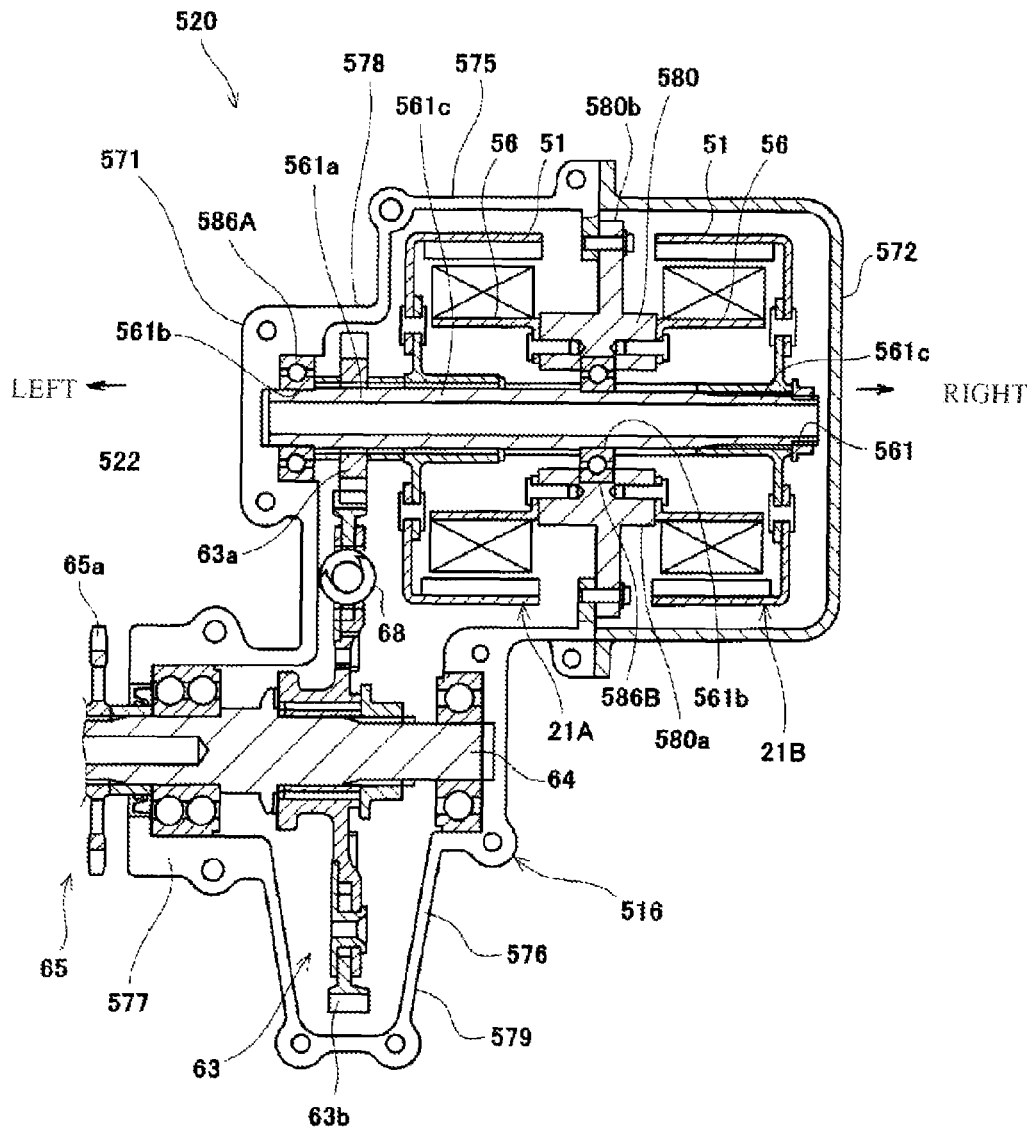
FIG. 10 is a cross-sectional view illustrating the structure of the periphery of an electric motor of a power device according to a sixth embodiment of the present invention.

FIG. 10 is a cross-sectional view illustrating the structure of the periphery of an electric motor of a power device 520 according to a sixth embodiment of the present invention. As illustrated in FIG. 10, the power device 520 according to the present embodiment includes two electric motors including a first electric motor 21A and a second electric motor 21B. The two electric motors 21A and 21B are the same outer rotor type SPM motors as the first embodiment. Output shaft portions 31 of the first electric motor 21A and the second electric motor 21B are united to serve as one common output shaft 561. A driving force transmission mechanism 522 includes this one common output shaft 561, a primary driving force transmission mechanism 63 similar to that of the first embodiment, an intermediate shaft 64, and a secondary driving force transmission mechanism 65. Also in the present embodiment, the speed change ratio of each output shaft portion 31 with respect to a rear wheel 3 (refer to FIG. 1) can be made equal to each other.

The common output shaft 561 includes a mechanism installation portion 561a, a pair of journal portions 561b, and a pair of motor installation portions 561c. The pair of journal portions 561b are provided in a left end portion and a center portion of the common output shaft 561 in an axial direction. The mechanism installation portion 561a is provided to be adjacent to the right side of the journal portion 561b located in the left end portion, one motor installation portion 561c is provided between the mechanism installation portion 561a and the journal portion 561b located in the center portion, and the other motor installation portion 561c is provided in the right end portion of the common output shaft 561.

A mechanism accommodation portion 576 of a motor housing 571 of a motor case member 516 includes a driving side accommodation portion 578 and a driven side accommodation portion 579 which are similar to those of the first embodiment. A shaft accommodation portion 577 is provided such as to protrude toward the left side from a left wall of the driven side accommodation portion 578. A pair of motor accommodation portions 575 and the driving side accommodation portion 578 are arranged in the axial direction. The motor accommodation portion 575 is adjacent to the right side of the driving side accommodation portion 578, and a left portion of the motor accommodation portion 575 has an opening. A barrier wall member 580 is installed to the motor accommodation portion 575 from the left side in a manner of covering the opening, and a motor cover 572 is installed to the motor accommodation portion 575 from the left side in a manner of accommodating the barrier wall member 580.

The journal portion 561b of the common output shaft 561 is rotatably supported by a bearing 586A installed to the driving side accommodation portion 578, and a bearing 586B installed to a central portion of the barrier wall member 580. Thus, the mechanism installation portion 561a is accommodated in the driving side accommodation portion 578, the left side motor installation portion 561c is accommodated in the left side motor accommodation portion 575, and the right side motor installation portion 561c is accommodated in the inside of the motor cover 572. A rotor 51 of the first electric motor 21A is spline-fined into the left side motor installation portion 561c, and a rotor 51 of the second electric motor 21B is spline-fitted into the right side motor installation portion 561c. A stator 56 of the first electric motor 21A is fastened to a left side surface of the barrier wall member 580, and a stator 56 of the second electric motor 21B is fastened to a right side surface of the barrier wall member 580.

The present embodiment is also useful like the fourth embodiment in that two electric motors can be arranged to deviate from the center in a vehicle width direction.

Seventh Embodiment

Figure 11:
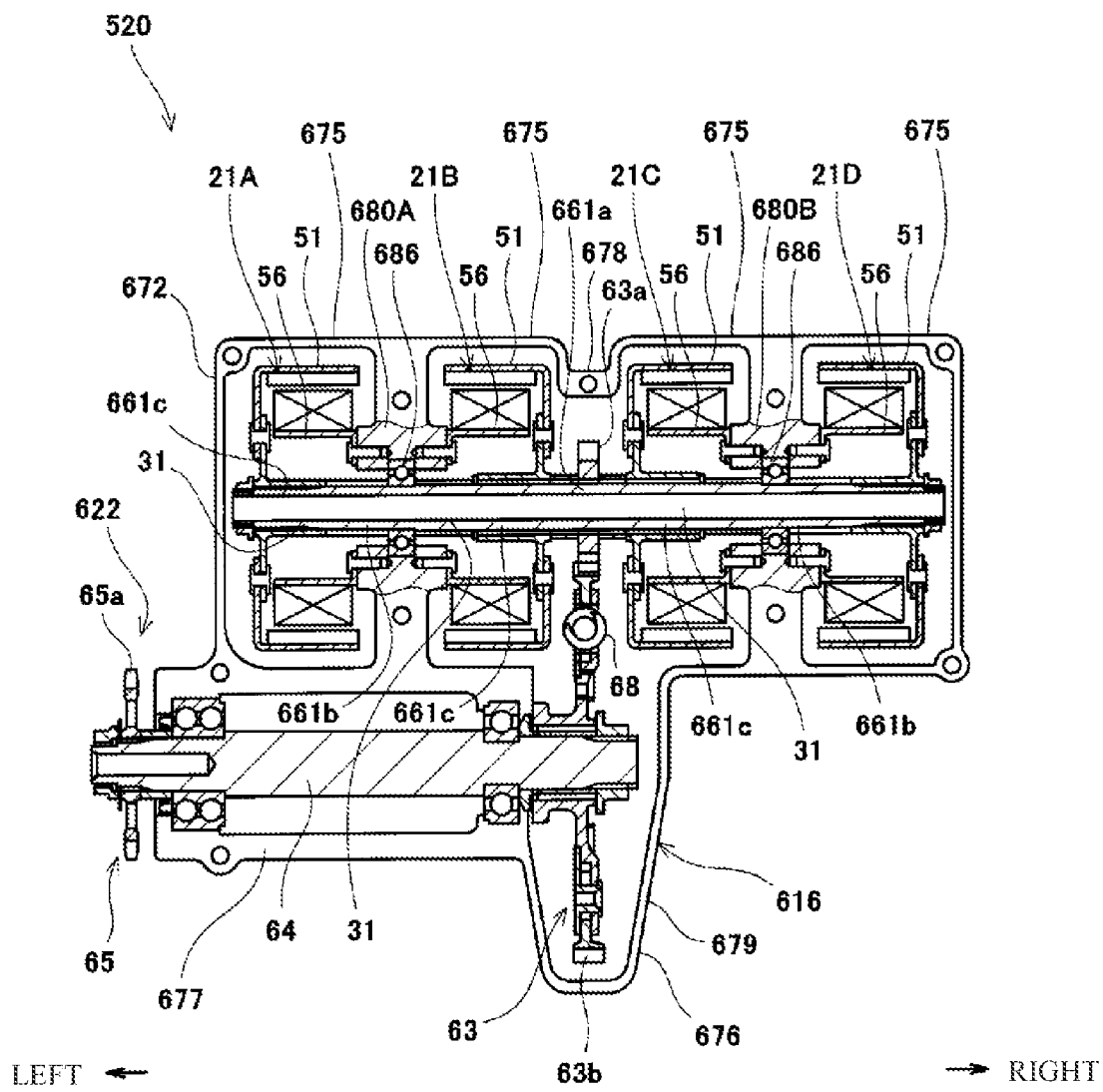
FIG. 11 is a cross-sectional view illustrating the structure of the periphery of an electric motor of a power device according to a seventh embodiment of the present invention.

FIG. 11 is a cross-sectional view illustrating the structure of the periphery of an electric motor of a power device 620 according to a seventh embodiment of the present invention. As illustrated in FIG. 11, a power device 620 according to the present embodiment includes four electric motors including a first electric motor 21A, a second electric motor 21B, a third electric motor 21C, and a fourth electric motor 21D, and all the electric motors are outer rotor type SPM motors. Output shaft portions 31 of the four electric motors 21A, 21B, 21C, and 21D are united to serve as one common output shaft 661. A driving force transmission mechanism 622 includes this one common output shaft 661, a primary driving force transmission mechanism 63 similar to that of the first embodiment, an intermediate shaft 64, and a secondary driving force transmission mechanism 65. Also in the present embodiment, the speed change ratio of each output shaft portion 31 with respect to a rear wheel (refer to FIG. 1) can be made equal to each other.

The common output shaft 661 includes a mechanism installation portion 661a, a pair of journal portions 661b, and four motor installation portions 661c. The mechanism installation portion 661a is provided in a central portion in an axial direction. The pair of journal portions 661b are separately arranged at both sides in the axial direction when viewed from the mechanism installation portion 661a. The four motor installation portions 661c are provided between a left end of the common output shaft 661 and the left side journal portion 661b, between the left side journal portion 661b and the mechanism installation portion 661a, between the mechanism installation portion 661a and the right side journal portion 661b, and between the right side journal portion 661b and a right end of the common output shaft 661, respectively.

A mechanism accommodation portion 676 of a motor housing 671 of a motor case member 616 includes a driving side accommodation portion 678 and a driven side accommodation portion 679 which are similar to those of the first embodiment. A shaft accommodation portion 677 is provided such as to protrude toward the left side from a left wall of the driven side accommodation portion 679. Four motor accommodation portions 675 are provided to be in line with the driving side accommodation portion 678 in the axial direction. Among them, two are arranged on the left side of the driving side accommodation portion 678, and the other two are arranged on the right side of the driving side accommodation portion 678. The two motor accommodation portions 675 on the left side are arranged in the axial direction with a barrier wall 680A therebetween, and the two motor accommodation portions 675 on the right side are arranged in the axial direction with a barrier wall 680B therebetween.

A pair of journal portions 661b of the common output shaft 661 are rotatably supported by a bearing 686 installed to the barrier walls 680A and 680B. Then, the mechanism installation portion 661a is accommodated in the driving side accommodation portion 678, and four motor installation portions 661c arranged in the axial direction are accommodated in the four motor accommodation portions 675, respectively. A rotor 51 of the electric motor 21 is spline-fitted into each motor installation portion 661c. On the other hand, a stator 56 of the first electric motor 21A, is fastened to the left side surface of the left-side barrier wall 680A, and a stator 56 of the second electric motor 21B is fastened to the right side surface of the left-side barrier wall 680A. In addition, a stator 56 of the third electric motor 21C is fastened to the left side surface of the right-side barrier wall 680B, and a stator 56 of the fourth electric motor 21D is fastened to the right side surface of the right-side barrier wall 480B. Thus, according to present embodiment, since four electric motors can be arranged on the same axis line, the power device 620 can be configured to be compact in the radial direction of the electric motors.

According to the present embodiment, since four electric motors are provided on the same common output shaft. When a motor case member is supported on a frame such that the common output shaft faces in the vehicle width direction, an object of a heavy load is arranged at a position where the common output shaft is arranged in the vehicle longitudinal direction. Thus, by arranging the common output shaft and four electric motors serving as objects of a heavy load at a position which is under the main frame and ahead of the swing arm, an object of a heavy load can be arranged between a front wheel and a rear wheel, and the gravity center can be lowered. Thereby, deterioration of steering stability can be prevented regardless of an increase in the weight of the power unit.

In addition, according to the first to seventh embodiments, although multiple electric motors provided on the same common output shaft is symmetrically arranged with respect to a certain plane perpendicular to the axial line of the common output shaft (that is, the openings of the rotors face each other or face in opposite directions), the multiple electric motors may be arranged such that the opening faces in the same direction.

Eighth Embodiment

FIG. 12 is a cross-sectional view illustrating the structure of the periphery of an electric motor of a power device 720 according to an eighth embodiment of the present invention. As illustrated in FIG. 12, the power device 720 according to the present embodiment includes two electric motors including a first electric motor 21A and a second electric motor 21B. The two electric motors 21A and 21B are the same outer rotor type SPM motors as the first embodiment. An output shaft portion 31A of the first electric motor 21A and an output shaft portion 31B of the second electric motor 21B are independently provided, and these output shaft portions 31A and 31B extend in parallel with each other. Even in the present embodiment, an electric circuit is designed such that the two electric motors 21A and 21B rotate in opposite directions by an alternating current output from one inverter device 24 (refer to FIG. 3).

The driving force transmission mechanism 720 includes the two output shaft portions 31A and 31B, a primary driving force transmission mechanism 763, and a secondary driving force transmission mechanism 765. The primary driving force transmission mechanism 763 transmits rotation of the output shaft portion 31B of the second electric motor 21B to the output shaft portion 31A of the first electric motor 21A without changing gears. The secondary driving force transmission mechanism 765 transmits rotation of the output shaft portion 31A of the first electric motor 21A to an axle 3a of a rear wheel 3. In this way, since the speed change ratio of the primary driving force transmission mechanism 763 is 1, the speed change ratio of the output shaft portion 31A with respect to the rear wheel 3 becomes equal to the speed change ratio of the output shaft portion 31B with respect to the rear wheel 3.

In the illustrated examples, a gear mechanism is adopted as the primary driving force transmission mechanism 763, and the primary driving force transmission mechanism 763 includes a driving gear which rotates together with the output shaft portion 31B of the second electric motor 21B, and a driven gear which meshes with the driving gear and which rotates together with the output shaft portion 31A of the first electric motor 21A. For this reason, the primary driving force transmission mechanism 763 can be configured to be compact in a radial direction of the electric motor 21, and the distance between the two output shaft portions can be reduced to the extent as large as possible. When the rotation directions of the output shaft portions 31A and 31B are the same, an idle gear may intervene between the driving gear and the driven gear, and a chain driving force transmission mechanism or a belt driving force transmission mechanism may be adopted as the primary driving force transmission mechanism 763 instead of the gear mechanism.

In the present embodiment, a swing arm 711 which extends in a front-back direction is used as a motor housing for accommodating the first electric motor 21A and the second electric motor 21B, and a motor case member 716 is configured using the swing arm 711 and a motor cover 772 which is provided outside the swing arm 711 in the vehicle width direction.

The swing arm 711 includes a pair of barrier walls 780A and 780B which face each other in the vehicle width direction, and the barrier walls 780A and 780B constitute a mechanism accommodation portion 776 for accommodating the primary driving force transmission mechanism 763. On the other hand, the output shaft portion 31A of the first electric motor 21A includes a mechanism installation portion 761a for installing a primary driven element 763b of the primary driving force transmission mechanism 763, a pair of journal portions 761b, and a single motor installation portion 761c. The pair of journal portions 761b are rotatably supported by a bearing 786 installed to each of the barrier walls 780A and 780B. Thus, the mechanism installation portion 761a is accommodated together with the primary driven element 763b in a space between the barrier walls 780A and 780B, and the motor installation portion 761c is arranged to protrude toward the left side from the left-side barrier wall 780A. A spline groove 762 is formed in the motor installation portion 761c, and a rotor 51 of the first electric motor 21A is spline-fitted into the motor installation portion 761c. The output shaft portion 31B of the second electric motor 21B is also attached to the swing arm 711 in the same manner as the output shaft portion 31A of the first electric motor 21A except that a primary driving element 763a of the primary driving force transmission mechanism 763 is attached to the mechanism installation portion 761a. Stators 56 of the first electric motor 21A and the second electric motor 21B are arranged in the front-back direction and fastened to an internal surface of the motor cover 772. Only by attaching the motor cover 772 to the swing arm 711, two stators 56 can be settled on the internal circumference side of the corresponding rotors 51, respectively.

A right end portion of the output shaft portion 31A of the first electric motor 21A protrudes from the right-side barrier wall 780B, and is disposed in a space on the internal side in the vehicle direction when viewed from the swing are 711. A secondary driving element 765a of a secondary driving force transmission mechanism 765 is attached to the right end portion of the output shaft portion 31A which is disposed in the way described above. For this reason, the secondary driving force transmission mechanism 765 can be disposed near a center portion in the vehicle width direction, and even when an electric motorcycle falls to the side, damage to the secondary driving force transmission mechanism 765 can be satisfactorily suppressed.

Wiring 797 for supplying alternating current to each coil 32 of the first electric motor 21A and the second electric motor 21B is embedded in the swing arm 711. One end of the wiring is connected to the front side surface of the motor cover 772, the wiring 797 extends through the inside of the swing arm 711 from there, and the other end is pulled out to the exterior of the swing arm 711 through the side surface of the center portion in the vehicle width direction, which is the surface opposite to a surface with which a pivot frame 10 is in contact. Thus, by this arrangement of the wiring 797, disconnection of wiring can be satisfactorily prevented.

As mentioned above, although the embodiments of the present invention were described, the above-mentioned configuration may be suitably changed within the scope of the present invention. The power device according to the present invention is not limited to an electromotive motorcycle, but may be applied also to other vehicles.

INDUSTRIAL APPLICABILITY

The present invention can simplify the configuration of a power device of an electric vehicle, which includes multiple electric motors, and is useful when it is applied, for example, to an electric motorcycle.

DESCRIPTION OF REFERENCE SIGNS

1: Electric motorcycle
3: Rear wheel
12: Swing arm
16: Motor case member
20: Power device
21: Electric motor
22: Driving force transmission mechanism
23: Electricity storage device
24: Inverter device
25: Control device
31: Output shaft portion
32: Three-phase coil
34: Battery
51: Rotor
55: Permanent magnet
56: Stator
61: Common output shaft
62: Spline groove
63: Primary driving force transmission mechanism
64: Intermediate shaft
65: Secondary driving force transmission mechanism
71: Motor housing
72: Motor cover
75: Motor accommodation portion
76: Mechanism accommodation portion
77: Shaft accommodation portion
78: Driving side accommodation portion
79: Driven side accommodation portion

The invention claimed is:

1. A power device of an electric vehicle comprising:
an electricity storage device that stores direct current as electricity;
an inverter device that generates alternating current from the direct current stored in the electricity storage device;
multiple electric motors that receive supply of electricity of the alternating current generated by the inverter device and generate a traveling driving force; and
a driving force transmission mechanism that transmits rotation of each output shaft portion of the multiple electric motors to an axle of a driving wheel and rotates the axle together with the driving wheel,
wherein the driving force transmission mechanism mechanically connects the output shaft portions to each other so that each of the output shaft portions rotates with an equal speed change ratio with respect to the axle of the driving wheel, and
the multiple electric motors are connected to the single inverter device so as to receive the supply of electricity of the alternating current generated by the single inverter device.

2. The power device of an electric vehicle according to claim 1, wherein among the multiple electric motors, each output shaft portion of at least two electric motors constitute one common output shaft together, and
the driving force transmission mechanism is configured to transmit rotation of the common output shaft to the axle of the driving wheel.

3. The power device of an electric vehicle according to claim 2, wherein a driving force extraction position, from which rotation of the common output shaft is extracted, is disposed between the two electric motors.

4. The power device of an electric vehicle according to claim 2, wherein rotational inertia of the multiple electric motors is equally set up.

5. The power device according to claim 1, further comprising a buffering device that is provided in the driving force transmission mechanism and buffers a sudden change in a driving force transmitted between the common output shaft and the driving wheel.

6. The power device of an electric vehicle according claim 1, wherein the multiple electric motors are multiphase alternating current motors, each including multiphase coils of an equal number of phases,
the single inverter device is connected to multiphase lines configured to output multiphase alternating currents corresponding to the number of phases of the multiphase coils, and
the coils of the same phase of the multiple electric motors are connected in parallel to the multiphase lines.

7. The power device of an electric vehicle according to claim 2, wherein the electric motor includes a rotor that rotates about an axial line in response to supply of electricity from the inverter device, and the rotor is spline-fitted into the common output shaft.

8. A power device of an electric vehicle comprising:
an electricity storage device that stores direct current as electricity;
an inverter device that generates alternating current from the direct current stored in the electricity storage device;
multiple electric motors that receive supply of electricity of the alternating current generated by the inverter device and generate a traveling driving force; and
a driving force transmission mechanism that transmits rotation of each output shaft portion of the multiple electric motors to a driving wheel, wherein
the driving force transmission mechanism mechanically connects the output shaft portions to each other so that each of the output shaft portions rotates with an equal speed change ratio with respect to the driving wheel,
the multiple electric motors are connected to the single inverter device so as to receive the supply of electricity of the alternating current generated by the single inverter device,
among the multiple electric motors, each output shaft portion of at least two electric motors constitute one common output shaft together,
the driving force transmission mechanism is configured to transmit rotation of the common output shaft to the driving wheel,
the one common output shaft is one of multiple common output shafts that extend in parallel with each other, and
the driving force transmission mechanism includes an intermediate shaft that extends in parallel with the multiple common output shafts, and a primary driving force transmission mechanism that transmits rotations of the multiple common output shafts to the intermediate shaft with an equal speed change ratio.

9. The power device of an electric vehicle according to claim 1, wherein each electric motor includes:
a rotor that rotates together with the output shaft portion, the rotor including a flange portion that is fixed onto the output shaft portion and extends in a radial direction from an external circumferential surface of the output shaft portion, and a circumferential wall portion that extends from an external edge portion of the flange portion in an axial direction and is disposed to be distanced from an external circumferential surface of the output shaft portion in the radial direction,
a permanent magnet that is affixed to an internal circumferential surface of the circumferential wall portion of the rotor,
a stator that is formed in a cylindrical shape and is settled in a circular ring-like space formed between the permanent magnet and the external circumferential surface of the output shaft portion, and
a coil that is fixed to an external circumferential surface of the stator and faces the permanent magnet in the radial direction.

10. The power device of an electric vehicle according to claim 1,
wherein the multiple electric motors have rotors of the same shape and stators of the same shape.

11. A power device of an electric vehicle, comprising:
an electricity storage device that stores direct current as electricity;
an inverter device that generates alternating current from the direct current stored in the electricity storage device;
multiple electric motors that receive supply of electricity of the alternating current generated by the inverter device and generate a traveling driving force; and
a driving force transmission mechanism that transmits rotation of each output shaft portion of the multiple electric motors to an axle of a driving wheel and rotates the axle together with the driving wheel,
wherein the driving force transmission mechanism mechanically connects the output shaft portions to each other so that each of the output shaft portions rotates with an equal speed change ratio with respect to the axle of the driving wheel,
wherein the multiple electric motors are connected to the single inverter device so as to receive the supply of electricity of the alternating current generated by the single inverter device,
wherein among the multiple electric motors, each output shaft portion of at least two electric motors constitute one common output shaft together,
wherein the driving force transmission mechanism is configured to transmit rotation of the common output shaft to the axle of the driving wheel,
wherein the electric vehicle is an electric motorcycle,
wherein the driving force transmission mechanism includes an intermediate shaft to which the rotation of the common output shaft is transmitted, and a secondary driving force transmission mechanism which transmits rotation of the intermediate shaft to the axle of the driving wheel, and
wherein the secondary driving force transmission mechanism includes a secondary driving element which is disposed at one side in a vehicle width direction with respect to a driving force extraction position, from which the rotation of the common output shaft is extracted, and the multiple electric motors are disposed at the other side in the vehicle width direction with respect to the driving force extraction position.

* * * * *